US010198731B1

(12) United States Patent
Spindel et al.

(10) Patent No.: US 10,198,731 B1
(45) Date of Patent: Feb. 5, 2019

(54) PERFORMING ACTIONS BASED ON THE LOCATION OF MOBILE DEVICE DURING A CARD SWIPE

(71) Applicant: Square, Inc., San Francisco, CA (US)

(72) Inventors: Nathan Spindel, San Francisco, CA (US); Shawn Morel, San Francisco, CA (US); Nefaur Rahman Khandker, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/182,655

(22) Filed: Feb. 18, 2014

(51) Int. Cl.
G06Q 20/40 (2012.01)
G06Q 20/20 (2012.01)
G06Q 20/34 (2012.01)

(52) U.S. Cl.
CPC ....... *G06Q 20/4016* (2013.01); *G06Q 20/204* (2013.01); *G06Q 20/34* (2013.01)

(58) Field of Classification Search
CPC ....... G06Q 20/40; G06Q 20/32; G06Q 20/204
USPC ................................. 705/17, 44; 455/456.2
See application file for complete search history.

(56) References Cited

U.S. PATENT DOCUMENTS

| | | |
|---|---|---|
| 5,590,038 A | 12/1996 | Pitroda |
| 5,652,421 A | 7/1997 | Veeneman et al. |
| 5,878,337 A | 3/1999 | Joao et al. |
| 5,960,411 A | 9/1999 | Hartman et al. |
| 6,154,738 A | 11/2000 | Call |
| 6,175,922 B1 | 1/2001 | Wang |
| 6,193,155 B1 | 2/2001 | Walker et al. |
| 6,263,352 B1 | 7/2001 | Cohen |
| 6,330,544 B1 | 12/2001 | Walker et al. |
| 6,341,353 B1 | 1/2002 | Herman et al. |
| 7,085,812 B1 | 8/2006 | Sherwood |
| 7,155,411 B1 | 12/2006 | Blinn et al. |

(Continued)

FOREIGN PATENT DOCUMENTS

| | | |
|---|---|---|
| AU | 2017235924 A1 | 10/2017 |
| CA | 2 916 603 A1 | 12/2014 |

(Continued)

OTHER PUBLICATIONS

U.S. Appl. No. 14/208,800 of Thome, J.P. et al., filed Mar. 13, 2014.

(Continued)

Primary Examiner — Olusegun Goyea
(74) Attorney, Agent, or Firm — Mattingly & Malur, PC

(57) ABSTRACT

Various embodiments are related to apparatuses and methods for basing actions on a location of a card swipe. A computer system receives information indicative of a location of a mobile device associated with a customer at a time corresponding to a swipe of a payment card at a card reader of a merchant. The location information can indicate, for example, the location of the mobile device as being at a GPS coordinate, or at a merchant's place of business. When the location information indicates that the mobile device and the card swipe are located near to each other, or are both located at the same merchant's place of business, a reduced level of fraud analysis can be used when authorizing the purchase transaction. A targeted ad can be sent to a mobile device associated with the customer based on the location of the card reader used for the card swipe.

18 Claims, 9 Drawing Sheets

(56) References Cited

U.S. PATENT DOCUMENTS

| | | |
|---|---|---|
| 7,233,843 B2 | 6/2007 | Budhraja et al. |
| 7,475,024 B1 | 1/2009 | Phan |
| 7,478,054 B1 | 1/2009 | Adams et al. |
| 7,493,390 B2 | 2/2009 | Bobde et al. |
| 7,552,087 B2 | 6/2009 | Schultz et al. |
| 7,575,166 B2 | 8/2009 | McNamara |
| 7,580,873 B1 | 8/2009 | Silver et al. |
| 7,603,382 B2 | 10/2009 | Halt, Jr. |
| 7,764,185 B1 | 7/2010 | Manz et al. |
| 7,805,378 B2 | 9/2010 | Berardi et al. |
| 7,810,729 B2 | 10/2010 | Morley, Jr. |
| 7,818,809 B1 | 10/2010 | Sobel et al. |
| 8,060,259 B2 | 11/2011 | Budhraja et al. |
| 8,112,066 B2 | 2/2012 | Ben Ayed |
| 8,190,514 B2 | 5/2012 | Bishop et al. |
| 8,266,551 B2 | 9/2012 | Boldyrev et al. |
| 8,401,710 B2 | 3/2013 | Budhraja et al. |
| 8,423,459 B1 | 4/2013 | Green et al. |
| 8,434,682 B1 | 5/2013 | Argue et al. |
| 8,459,544 B2 | 6/2013 | Casey et al. |
| 8,498,888 B1 | 7/2013 | Raff et al. |
| 8,577,803 B2 | 11/2013 | Chatterjee et al. |
| 8,577,810 B1 | 11/2013 | Dalit et al. |
| 8,579,203 B1 | 11/2013 | Lambeth et al. |
| 8,602,296 B1 | 12/2013 | Velline et al. |
| 8,630,586 B2 | 1/2014 | Dvortsov et al. |
| 8,676,119 B2 | 3/2014 | Cohen et al. |
| 8,788,418 B2 | 7/2014 | Spodak et al. |
| 8,855,312 B1 | 10/2014 | Hodgman et al. |
| 8,859,337 B2 | 10/2014 | Gaul et al. |
| 8,892,462 B1 | 11/2014 | Borovsky et al. |
| 8,939,357 B1 | 1/2015 | Perry |
| 8,972,298 B2 | 3/2015 | Kunz et al. |
| 9,010,644 B1 | 4/2015 | Workley |
| 9,064,249 B1 | 6/2015 | Borovsky et al. |
| 9,092,767 B1 | 7/2015 | Andrews et al. |
| 9,092,776 B2 | 7/2015 | Dessert |
| 9,092,828 B2 | 7/2015 | Hosp |
| 9,195,985 B2 | 11/2015 | Domenica et al. |
| 9,721,251 B1 | 8/2017 | Jen et al. |
| 2002/0091646 A1 | 7/2002 | Lake et al. |
| 2003/0014317 A1 | 1/2003 | Siegel et al. |
| 2003/0061157 A1 | 3/2003 | Hirka et al. |
| 2003/0065805 A1 | 4/2003 | Barnes, Jr. |
| 2003/0115126 A1 | 6/2003 | Pitroda |
| 2003/0115285 A1 | 6/2003 | Lee et al. |
| 2003/0204447 A1 | 10/2003 | Dalzell et al. |
| 2004/0030601 A1 | 2/2004 | Pond et al. |
| 2004/0138999 A1 | 7/2004 | Friedman et al. |
| 2004/0193489 A1 | 9/2004 | Boyd et al. |
| 2004/0204990 A1 | 10/2004 | Lee et al. |
| 2004/0215520 A1 | 10/2004 | Butler et al. |
| 2004/0219971 A1 | 11/2004 | Ciancio et al. |
| 2005/0055582 A1 | 3/2005 | Bazakos et al. |
| 2005/0246245 A1 | 11/2005 | Satchell et al. |
| 2006/0064373 A1 | 3/2006 | Kelley |
| 2006/0085333 A1 | 4/2006 | Wah et al. |
| 2006/0131385 A1 | 6/2006 | Kim |
| 2006/0146839 A1 | 7/2006 | Hurwitz et al. |
| 2006/0261149 A1 | 11/2006 | Raghavendra Tulluri |
| 2007/0069013 A1 | 3/2007 | Seifert et al. |
| 2007/0073619 A1 | 3/2007 | Smith |
| 2007/0208930 A1 | 9/2007 | Blank et al. |
| 2007/0255653 A1 | 11/2007 | Tumminaro et al. |
| 2007/0255662 A1 | 11/2007 | Tumminaro |
| 2008/0035725 A1 | 2/2008 | Jambunathan et al. |
| 2008/0037442 A1 | 2/2008 | Bill |
| 2008/0040265 A1 | 2/2008 | Rackley, III et al. |
| 2008/0052176 A1 | 2/2008 | Buchheit |
| 2008/0078831 A1 | 4/2008 | Johnson et al. |
| 2008/0133351 A1 | 6/2008 | White et al. |
| 2008/0177624 A9 | 7/2008 | Dohse |
| 2008/0177826 A1 | 7/2008 | Pitroda |
| 2008/0197188 A1 | 8/2008 | Jagatic et al. |
| 2008/0262925 A1 | 10/2008 | Kim et al. |
| 2008/0270246 A1 | 10/2008 | Chen |
| 2008/0277465 A1 | 11/2008 | Pletz et al. |
| 2008/0296978 A1 | 12/2008 | Finkenzeller et al. |
| 2009/0070228 A1 | 3/2009 | Ronen |
| 2009/0099961 A1 | 4/2009 | Ogilvy |
| 2009/0106138 A1 | 4/2009 | Smith et al. |
| 2009/0112766 A1 | 4/2009 | Hammad et al. |
| 2009/0119190 A1 | 5/2009 | Realini |
| 2009/0159663 A1 | 6/2009 | Mullen et al. |
| 2009/0192904 A1 | 7/2009 | Patterson et al. |
| 2009/0266884 A1 | 10/2009 | Killian et al. |
| 2009/0271265 A1 | 10/2009 | Lay et al. |
| 2009/0288012 A1 | 11/2009 | Hertel et al. |
| 2009/0313132 A1 | 12/2009 | McKenna et al. |
| 2009/0319421 A1 | 12/2009 | Mathis et al. |
| 2009/0319638 A1 | 12/2009 | Faith et al. |
| 2010/0010906 A1 | 1/2010 | Grecia |
| 2010/0076777 A1 | 3/2010 | Paretti et al. |
| 2010/0082420 A1 | 4/2010 | Trifiletti et al. |
| 2010/0102125 A1 | 4/2010 | Gatto |
| 2010/0174596 A1 | 7/2010 | Gilman et al. |
| 2010/0223145 A1 | 9/2010 | Dragt |
| 2010/0269059 A1 | 10/2010 | Olthmeret et al. |
| 2010/0306099 A1 | 12/2010 | Hirson et al. |
| 2011/0029416 A1 | 2/2011 | Greenspan |
| 2011/0047013 A1 | 2/2011 | McKenzie, III |
| 2011/0055084 A1 | 3/2011 | Singh |
| 2011/0071892 A1 | 3/2011 | Dickelman |
| 2011/0087550 A1 | 4/2011 | Fordyce, III et al. |
| 2011/0131128 A1 | 6/2011 | Vaananen |
| 2011/0145049 A1 | 6/2011 | Hertel et al. |
| 2011/0145052 A1 | 6/2011 | Lin et al. |
| 2011/0178883 A1 | 7/2011 | Granbery et al. |
| 2011/0180598 A1 | 7/2011 | Morgan et al. |
| 2011/0218871 A1 | 9/2011 | Singh |
| 2011/0246284 A1 | 10/2011 | Chaikin et al. |
| 2011/0251892 A1 | 10/2011 | Laracey |
| 2011/0251962 A1 | 10/2011 | Hruska |
| 2011/0258014 A1 | 10/2011 | Evangelist et al. |
| 2011/0258689 A1 | 10/2011 | Cohen et al. |
| 2011/0270747 A1 | 11/2011 | Xu |
| 2011/0276418 A1 | 11/2011 | Velani |
| 2011/0295750 A1 | 12/2011 | Rammal |
| 2011/0302019 A1 | 12/2011 | Proctor, Jr. et al. |
| 2011/0302080 A1 | 12/2011 | White et al. |
| 2011/0313840 A1 | 12/2011 | Mason et al. |
| 2011/0313867 A9 | 12/2011 | Silver |
| 2011/0313871 A1 | 12/2011 | Greenwood |
| 2011/0320345 A1 | 12/2011 | Taveau et al. |
| 2012/0011072 A1 | 1/2012 | Lodolo |
| 2012/0016731 A1 | 1/2012 | Smith et al. |
| 2012/0029990 A1 | 2/2012 | Fisher |
| 2012/0030044 A1 | 2/2012 | Hurst |
| 2012/0059701 A1 | 3/2012 | van der Veen et al. |
| 2012/0059718 A1 | 3/2012 | Ramer et al. |
| 2012/0059758 A1 | 3/2012 | Carlson |
| 2012/0084210 A1 | 4/2012 | Farahmand |
| 2012/0089418 A1 | 4/2012 | Kamath et al. |
| 2012/0095867 A1 | 4/2012 | McKelvey |
| 2012/0095871 A1 | 4/2012 | Dorsey et al. |
| 2012/0110568 A1 | 5/2012 | Abel et al. |
| 2012/0143772 A1 | 6/2012 | Abadir |
| 2012/0150611 A1 | 6/2012 | Isaacson et al. |
| 2012/0150643 A1 | 6/2012 | Wolfe et al. |
| 2012/0150742 A1 | 6/2012 | Poon et al. |
| 2012/0166311 A1 | 6/2012 | Dwight et al. |
| 2012/0185306 A1 | 7/2012 | Cheng |
| 2012/0185355 A1 | 7/2012 | Kilroy |
| 2012/0197740 A1 | 8/2012 | Grigg et al. |
| 2012/0197743 A1 | 8/2012 | Grigg et al. |
| 2012/0197794 A1 | 8/2012 | Grigg et al. |
| 2012/0209749 A1 | 8/2012 | Hammad et al. |
| 2012/0209773 A1* | 8/2012 | Ranganathan ......... G06Q 20/40 705/44 |
| 2012/0214416 A1 | 8/2012 | Kent et al. |
| 2012/0244885 A1* | 9/2012 | Hefetz ................... G06Q 20/32 455/456.2 |
| 2012/0254031 A1 | 10/2012 | Walker et al. |
| 2012/0271707 A1 | 10/2012 | Harrison et al. |

(56) References Cited

U.S. PATENT DOCUMENTS

| | | |
|---|---|---|
| 2012/0271725 A1 | 10/2012 | Cheng |
| 2012/0278727 A1 | 11/2012 | Ananthakrishnan et al. |
| 2012/0284036 A1 | 11/2012 | Evans |
| 2012/0290422 A1 | 11/2012 | Bhinder |
| 2012/0290609 A1 | 11/2012 | Britt |
| 2012/0296679 A1 | 11/2012 | Im |
| 2012/0296726 A1 | 11/2012 | Dessert et al. |
| 2012/0323685 A1 | 12/2012 | Ullah |
| 2013/0006773 A1 | 1/2013 | Lutnick et al. |
| 2013/0019284 A1 | 1/2013 | Pacyga et al. |
| 2013/0024341 A1 | 1/2013 | Jeon et al. |
| 2013/0024364 A1 | 1/2013 | Shrivastava et al. |
| 2013/0024371 A1 | 1/2013 | Hariramani et al. |
| 2013/0030889 A1 | 1/2013 | Davich et al. |
| 2013/0041824 A1 | 2/2013 | Gupta |
| 2013/0048719 A1 | 2/2013 | Bennett |
| 2013/0050080 A1 | 2/2013 | Dahl et al. |
| 2013/0054320 A1 | 2/2013 | Dorso et al. |
| 2013/0065672 A1 | 3/2013 | Gelman et al. |
| 2013/0066783 A1 | 3/2013 | Wolff |
| 2013/0073363 A1 | 3/2013 | Boal |
| 2013/0103574 A1 | 4/2013 | Conrad et al. |
| 2013/0103946 A1 | 4/2013 | Binenstock |
| 2013/0117329 A1 | 5/2013 | Bank et al. |
| 2013/0124333 A1 | 5/2013 | Doughty et al. |
| 2013/0132140 A1 | 5/2013 | Amin et al. |
| 2013/0132246 A1 | 5/2013 | Amin et al. |
| 2013/0132274 A1 | 5/2013 | Henderson et al. |
| 2013/0132887 A1 | 5/2013 | Amin et al. |
| 2013/0134962 A1 | 5/2013 | Kamel et al. |
| 2013/0138563 A1 | 5/2013 | Gilder et al. |
| 2013/0144707 A1 | 6/2013 | Issacson et al. |
| 2013/0151613 A1 | 6/2013 | Dhawan et al. |
| 2013/0159081 A1 | 6/2013 | Shastry et al. |
| 2013/0159172 A1 | 6/2013 | Kim |
| 2013/0159173 A1 | 6/2013 | Sivaraman et al. |
| 2013/0159446 A1 | 6/2013 | Carlson et al. |
| 2013/0166402 A1 | 6/2013 | Parento et al. |
| 2013/0166445 A1 | 6/2013 | Issacson et al. |
| 2013/0173407 A1 | 7/2013 | Killian et al. |
| 2013/0179227 A1 | 7/2013 | Booth et al. |
| 2013/0181045 A1 | 7/2013 | Dessert et al. |
| 2013/0198018 A1 | 8/2013 | Baig |
| 2013/0204727 A1 | 8/2013 | Rothschild |
| 2013/0204777 A1 | 8/2013 | Irwin, Jr. et al. |
| 2013/0204793 A1 | 8/2013 | Kerridge et al. |
| 2013/0218697 A1 | 8/2013 | Kingston et al. |
| 2013/0218721 A1 | 8/2013 | Borhan et al. |
| 2013/0225081 A1 | 8/2013 | Doss et al. |
| 2013/0228616 A1 | 9/2013 | Bhosle et al. |
| 2013/0236109 A1 | 9/2013 | Madden et al. |
| 2013/0246203 A1 | 9/2013 | Laracey |
| 2013/0246207 A1 | 9/2013 | Novak et al. |
| 2013/0246280 A1 | 9/2013 | Kirsch |
| 2013/0246301 A1 | 9/2013 | Radhakrishnan et al. |
| 2013/0248591 A1 | 9/2013 | Look et al. |
| 2013/0268431 A1 | 10/2013 | Mohsenzadeh |
| 2013/0290173 A1 | 10/2013 | Nemeroff |
| 2013/0290522 A1 | 10/2013 | Behm, Jr. |
| 2013/0291018 A1 | 10/2013 | Billings et al. |
| 2013/0297933 A1 | 11/2013 | Fiducia et al. |
| 2013/0317835 A1 | 11/2013 | Mathew |
| 2013/0317950 A1 | 11/2013 | Abraham et al. |
| 2013/0332354 A1 | 12/2013 | Rhee et al. |
| 2013/0332385 A1 | 12/2013 | Kilroy et al. |
| 2013/0339253 A1 | 12/2013 | Sincai |
| 2013/0346223 A1 | 12/2013 | Prabhu et al. |
| 2014/0006205 A1 | 1/2014 | Berry et al. |
| 2014/0012754 A1 | 1/2014 | Hanson et al. |
| 2014/0019236 A1 | 1/2014 | Argue et al. |
| 2014/0025446 A1 | 1/2014 | Nagarajan et al. |
| 2014/0032297 A1 | 1/2014 | Germann et al. |
| 2014/0052617 A1 | 2/2014 | Chawla et al. |
| 2014/0057667 A1 | 2/2014 | Blankenship et al. |
| 2014/0058861 A1 | 2/2014 | Argue et al. |
| 2014/0067557 A1 | 3/2014 | van Niekerk et al. |
| 2014/0074569 A1 | 3/2014 | Francis et al. |
| 2014/0074655 A1 | 3/2014 | Lim et al. |
| 2014/0074658 A1 | 3/2014 | Sanchez |
| 2014/0074691 A1 | 3/2014 | Bank et al. |
| 2014/0074716 A1 | 3/2014 | Ni |
| 2014/0081783 A1 | 3/2014 | Paranjape et al. |
| 2014/0081853 A1 | 3/2014 | Sanchez et al. |
| 2014/0081854 A1 | 3/2014 | Sanchez et al. |
| 2014/0084059 A1 | 3/2014 | Sierchio et al. |
| 2014/0089073 A1 | 3/2014 | Jacobs et al. |
| 2014/0089078 A1 | 3/2014 | Dessert et al. |
| 2014/0096179 A1 | 4/2014 | Ben-Shalom et al. |
| 2014/0099888 A1 | 4/2014 | Flanagan et al. |
| 2014/0100931 A1 | 4/2014 | Sanchez et al. |
| 2014/0100973 A1 | 4/2014 | Brown et al. |
| 2014/0101737 A1 | 4/2014 | Rhee |
| 2014/0108245 A1 | 4/2014 | Drummond et al. |
| 2014/0114775 A1 | 4/2014 | Cloin et al. |
| 2014/0114781 A1 | 4/2014 | Watanabe |
| 2014/0122345 A1 | 5/2014 | Argue et al. |
| 2014/0129135 A1 | 5/2014 | Holden et al. |
| 2014/0129302 A1 | 5/2014 | Amin et al. |
| 2014/0129357 A1 | 5/2014 | Goodwin |
| 2014/0129942 A1 | 5/2014 | Rathod |
| 2014/0129951 A1 | 5/2014 | Amin et al. |
| 2014/0136318 A1 | 5/2014 | Alberth, Jr. et al. |
| 2014/0136349 A1 | 5/2014 | Dave et al. |
| 2014/0149282 A1 | 5/2014 | Philliou et al. |
| 2014/0156508 A1 | 6/2014 | Argue et al. |
| 2014/0156517 A1 | 6/2014 | Argue et al. |
| 2014/0164234 A1 | 6/2014 | Coffman et al. |
| 2014/0180805 A1 | 6/2014 | Argue et al. |
| 2014/0184505 A1 | 7/2014 | Fullerton et al. |
| 2014/0188639 A1* | 7/2014 | Dinardo, Sr. ........ G06Q 20/204 705/17 |
| 2014/0201067 A1 | 7/2014 | Lai et al. |
| 2014/0207669 A1 | 7/2014 | Rosenberg |
| 2014/0214567 A1 | 7/2014 | Llach et al. |
| 2014/0214652 A1 | 7/2014 | Zheng et al. |
| 2014/0236762 A1 | 8/2014 | Gerber et al. |
| 2014/0249947 A1 | 9/2014 | Hicks et al. |
| 2014/0250002 A1 | 9/2014 | Issacson et al. |
| 2014/0254820 A1 | 9/2014 | Gardenfors et al. |
| 2014/0257958 A1 | 9/2014 | Andrews |
| 2014/0278589 A1 | 9/2014 | Rados et al. |
| 2014/0279098 A1 | 9/2014 | Ham |
| 2014/0279184 A1 | 9/2014 | Lai et al. |
| 2014/0379497 A1 | 12/2014 | Varma et al. |
| 2014/0379536 A1 | 12/2014 | Varma et al. |
| 2014/0379580 A1 | 12/2014 | Varma et al. |
| 2015/0012426 A1 | 1/2015 | Purves et al. |
| 2015/0025983 A1 | 1/2015 | Cicerchi |
| 2015/0032567 A1 | 1/2015 | Bhatia |
| 2015/0058146 A1 | 2/2015 | Gaddam et al. |
| 2015/0066765 A1 | 3/2015 | Banks et al. |
| 2015/0073907 A1 | 3/2015 | Purves et al. |
| 2015/0095228 A1 | 4/2015 | Su et al. |
| 2015/0100481 A1 | 4/2015 | Ghosh et al. |
| 2015/0112838 A1 | 4/2015 | Li et al. |
| 2015/0120418 A1 | 4/2015 | Cervenka et al. |
| 2015/0134513 A1 | 5/2015 | Olson et al. |
| 2015/0134528 A1 | 5/2015 | Fineman et al. |
| 2015/0178755 A1 | 6/2015 | Barroso |
| 2015/0194023 A1 | 7/2015 | Brackenridge et al. |
| 2015/0294312 A1 | 10/2015 | Kendrick et al. |
| 2016/0086166 A1 | 3/2016 | Pomeroy et al. |

FOREIGN PATENT DOCUMENTS

| | | |
|---|---|---|
| KR | 10-2006-0103089 A | 9/2006 |
| WO | 2014/210020 A1 | 12/2014 |

OTHER PUBLICATIONS

U.S. Appl. No. 14/225,338 of Aaron, P. et al., filed Mar. 25, 2014.
Non-Final Office Action dated Apr. 10, 2014, U.S. Appl. No. 14/160,490 of Morig, D., et al., filed Jan. 21, 2014.

(56) References Cited

OTHER PUBLICATIONS

Non-Final Office Action dated Apr. 4, 2014, U.S. Appl. No. 14/172,842 of Borovsky, A. et al., filed Feb. 4, 2014.
Restriction Requirement dated Apr. 28, 2014, U.S. Appl. No. 14/165,256 of Aaron, P., filed Jan. 27, 2014.
"Another EBay Band-Aid Fails to Fix the New Pricing Structure Flaws," dated Oct. 18, 2008, Retrieved from the Internet URL: https://thebrewsnews.wordpress.com/2008/10/18/another-ebay-band-aid-fails-to-fix-the-new-pricing-structure-flaws/, pp. 1-5.
"Online Shopping," dated Nov. 2, 2014, Retrieved from the Internet URL: http://en.wikipedia.org/wiki/Online_shopping, on Nov. 10, 2014, pp. 1-12.
Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.
Myres, L., "What is Multi-Factor Authentication, and How Will It Change in the Future?," Intego, dated Aug. 17, 2012, Retrieved from the Internet URL: http://www.intego.com/mac-security-blog/what-is-multi-factor-authentication-and-how-will-it-change-in-the-future/, on Nov. 11, 2014, pp. 1-4.
Wallen, J., "Five Top Apps for Managing Inventory," Tech Republic, dated Aug. 15, 2012, Retrieved from the Internet URL: http://www.techrepublic.com/blog/five-apps/five-top-apps-for-managing-inventory/, on Nov. 10, 2014, pp. 1-7.
U.S. Appl. No. 13/829,080, of Morgan, T.B., et al., filed Mar. 14, 2013.
U.S. Appl. No. 13/829,658, of Morgan, T.B., et al., filed Mar. 14, 2013.
U.S. Appl. No. 14/197,704, of Lamba, K., et al., filed Mar. 5, 2014.
U.S. Appl. No. 14/329,638, of Aaron, P., et al., filed Jul. 11, 2014.
U.S. Appl. No. 14/329,658, of Aaron, P., et al., filed Jul. 11, 2014.
U.S. Appl. No. 14/730,860, of Sasmaz, Y., et al., filed Jun. 4, 2015.
Non-Final Office Action dated Mar. 19, 2015, for U.S. Appl. No. 14/329,638, of Aaron, P., et al., filed Jul. 11, 2014.
Non-Final Office Action dated May 12, 2015, for U.S. Appl. No. 14/189,869, of Lamba, K., et al., filed Feb. 25, 2014.
Non-Final Office Action dated May 20, 2015, for U.S. Appl. No. 13/829,080, of Morgan, T.B., et al., filed Mar. 14, 2013.
Non-Final Office Action dated May 26, 2015, for U.S. Appl. No. 14/225,338, of Aaron, P., et al., filed Mar. 25, 2014.
Non-Final Office Action dated May 27, 2015, for U.S. Appl. No. 14/197,704, of Lamba, K., et al., filed Mar. 5, 2014.
Non-Final Office Action dated Jun. 11, 2015, for U.S. Appl. No. 14/692,655, of Borovsky, A., et al., filed Apr. 21, 2015.
Restriction Requirement dated Jun. 19, 2015, for U.S. Appl. No. 14/329,658, of Aaron, P., et al., filed Jul. 11, 2014.
Non-Final Office Action dated Jul. 2, 2015, for U.S. Appl. No. 14/208,800, of Thorne, J.P., et al., filed Mar. 13, 2014.
Non-Final Office Action dated Jul. 10, 2015, for U.S. Appl. No. 14/526,361, of White, M.W., et al, filed Oct. 28, 2014.
Final Office Action dated Aug. 18, 2015, for U.S. Appl. No. 14/145,895, of Aaron, P., et al., filed Dec. 31, 2013.
International Search Report and Written Opinion for PCT Application No. PCT/US2015/031423 dated Aug. 13, 2015.
Co-Pending U.S. Appl. No. 13/830,350 by Morgan, T.B. et al., filed Mar. 14, 2013.
Co-Pending U.S. Appl. No. 13/837,562 by Chin, H.C.A. et al., filed Mar. 15, 2013.
Co-Pending U.S. Appl. No. 14/088,113 by Maxwell, D.W. et al., filed Nov. 22, 2013.
Co-Pending U.S. Appl. No. 14/088,141 by Maxwell, D., filed Nov. 22, 2013.
Co-Pending U.S. Appl. No. 14/145,895 by Aaron, P., filed Dec. 31, 2013
Co-Pending U.S. Appl. No. 14/149,754 by Spindel, N., et al. filed Jan. 7, 2014.
Co-Pending U.S. Appl. No. 14/160,490 by Morig, D., et al., filed Jan. 21, 2014.
Co-Pending U.S. Appl. No. 14/165,256 by Aaron, P., filed Jan. 27, 2014.
Co-Pending U.S. Appl. No. 14/168,274 by Odawa, A. et al., filed Jan. 30, 2014.
Co-Pending U.S. Appl. No. 14/172,842 by Borovsky, A. et al., filed Feb. 25, 2014.
Co-Pending U.S. Appl. No. 14/184,503 by Borovsky, A., filed Feb. 19, 2014.
Co-Pending U.S. Appl. No. 14/189,869 by Lamba, K. et al., filed Feb. 25, 2014.
Co-Pending U.S. Appl. No. 14/189,880 by Aaron, P. et al., filed Feb. 25, 2014.
Final Office Action dated Aug. 28, 2014, U.S. Appl. No. 14/160,490 of Morig, D., et al., filed Jan. 21, 2014.
Non-Final Office Action dated Aug. 27, 2014, U.S. Appl. No. 14/165,256 of Aaron, P., filed Jan. 27, 2014.
Non-Final Office Action dated May 29, 2014, U.S. Appl. No. 13/837,562 of Chin, H.C.A. et al., filed Mar. 15, 2013.
Notice of Allowance dated Aug. 1, 2014, U.S. Appl. No. 14/172,842 of Borovsky, A. et al., filed Feb. 4, 2014.
U.S. Appl. No. 14/513,076 of Borovsky, A., et al., filed Oct. 13, 2014.
U.S. Appl. No. 14/526,361 of White, M.W., et al., filed Oct. 28, 2014.
Advisory Action dated Nov. 18, 2014, U.S. Appl. No. 14/160,490 of Moring, D., et al., filed Jan. 21, 2014.
International search report and written opinion for PCT Application No. PCT/US2014/058398 dated Dec. 24, 2014.
Non-Final Office Action dated Jan. 9, 2015, U.S. Appl. No. 14/145,895 of Aaron, P., et al., filed Dec. 31, 2013.
International search report and written opinion for PCT Application No. PCT/US2014/058447 dated Jan. 15, 2015.
Final Office Action dated Jan. 26, 2015, U.S. Appl. No. 13/837,562 of Chin, H.C.A., et al., filed Mar. 15, 2013.
Notice of Allowance dated Feb. 20, 2015, U.S. Appl. No. 14/513,076 of Borovsky, A., et al., filed Oct. 13, 2014.
Final Office Action dated Mar. 17, 2015, U.S. Appl. No. 14/165,256 of Aaron, P., filed Jan. 27, 2014.
International search report and written opinion for PCT Application No. PCT/US2014/072269 dated Mar. 31, 2015.
Restriction Requirement dated Apr. 9, 2015, U.S. Appl. No. 14/225,338 of Aaron, P., et al., filed Mar. 25, 2014.
U.S. Appl. No. 14/692,655 of Borovsky, A., et al., filed Apr. 21, 2015.
Non-Final Office Action dated Apr. 27, 2015, U.S. Appl. No. 14/184,503 of Borovsky, A., et al., filed Feb. 19, 2014.
"Merchantindustry.com—Best Merchant Services," retrieved from internet URL: https://web.archive.org/web/20121020212419/http://www.merchantindustry.com/, on Dec. 30, 2015, pp. 1-7.
Advisory Action dated Dec. 30, 2015, for U.S. Appl. No. 14/692,655, of Borovsky, A., et al., filed Apr. 21, 2015.
Final Office Action dated Dec. 31, 2015, for U.S. Appl. No. 14/208,800, of Thorne, J. P., et al., filed Mar. 13, 2014.
Advisory Action dated Dec. 31, 2015, for U.S. Appl. No. 14/225,338, of Aaron, P., et al., filed Mar. 25, 2014.
Advisory Action dated Jan. 21, 2016, for U.S. Appl. No. 14/526,361, of White, M. W., et al., filed Oct. 28, 2014.
Non-Final Office Action dated Jan. 22, 2016, for U.S. Appl. No. 14/189,869, of Lamba, K., et al., filed Feb. 25, 2014.
Non-Final Office Action dated Feb. 2, 2016, for U.S. Appl. No. 13/829,080, of Morgan, T, B., et al., filed Mar. 14, 2013.
Restriction Requirement dated Feb. 29, 2016, for U.S. Appl. No. 14/088,141, of Maxwell, D. W., et al., filed Nov. 22, 2013.
Non-Final Office Action dated Mar. 14, 2016, for U.S. Appl. No. 14/692,655, of Borovsky, A., et al., filed Apr. 21, 2015.
Restriction Requirement dated Mar. 16, 2016, for U.S. Appl. No. 14/088,113, of Maxwell, D. W., et al., filed Nov. 22, 2013.
Non-Final Office Action dated Mar. 24, 2016, for U.S. Appl. No. 14/145,895, of Aaron, P., et al., filed Dec. 31, 2013.
"Tracking Inventory," PayPal, dated Jan. 4, 2010, Retrieved from the Internet URL: https://www.paypal-community.com/t5/How-to-use-PayPal-Archive/Tracking-inventory/td-p/19392, pp. 1-3.

(56) References Cited

OTHER PUBLICATIONS

Final Office Action dated Sep. 17, 2015, for U.S. Appl. No. 13/829,080, of Morgan, T.B., et al., filed Mar. 14, 2013.
Notice of Allowance dated Sep. 18, 2015, for U.S. Appl. No. 14/197,704, of Lamba, K., et al., filed Mar. 5, 2014.
Final Office Action dated Sep. 21, 2015, for U.S. Appl. No. 14/184,503, of Borovsky, A., et al., filed Feb. 19, 2014.
Non-Final Office Action mailed Sep. 30, 2015, for U.S. Appl. No. 14/189,880, of Aaron, P., filed Feb. 25, 2014.
Final Office Action dated Oct. 2, 2015, for U.S. Appl. No. 14/225,338, of Aaron, P., et al., filed Mar. 25, 2014.
Final Office Action dated Oct. 5, 2015, for U.S. Appl. No. 14/526,361, of White, M.W., et al., filed Oct. 28, 2014.
Non-Final Office Action mailed Oct. 5, 2015, for U.S. Appl. No. 13/829,658, of Morgan, T.B., et al., filed Mar. 14, 2013.
Non-Final Office Action dated Oct. 6, 2015, for U.S. Appl. No. 14/329,658, of Aaron, P., et al. filed Jul. 11, 2014.
Non-Final Office Action dated Oct. 8, 2015, for U.S. Appl. No. 14/165,256, of Aaron, P., filed Jan. 27, 2014.
Non-Final Office Action dated Oct. 8, 2015, for U.S. Appl. No. 14/149,754, of Spindel, N., et al., filed Jan. 7, 2014.
Final Office Action dated Oct. 16, 2015, for U.S. Appl. No. 14/692,655, of Borovsky, A., et al., filed Apr. 21, 2015.
Final Office Action dated Oct. 21, 2015, for U.S. Appl. No. 14/329,638, of Aaron, P., et al., filed Jul. 11, 2014.
Advisory Action dated Nov. 24, 2015, for U.S. Appl. No. 13/829,080, of Morgan, T.B., et al., filed Mar. 14, 2013.
Advisory Action dated Dec. 4, 2015, for U.S. Appl. No. 14/184,503, of Borovsky, A., et al., filed Feb. 19, 2014.
Shalmanese, "The Straight Dope Message Board," message dated Oct. 5, 2013, Retrieved from the internet URL: http://boards.straightdope.com/sdmb/showthread.php?t=703989%BB, on Jul. 18, 2016, pp. 1-10.
Non-Final Office Action dated Apr. 8, 2016, for U.S. Appl. No. 14/526,361, of White, M. W., et al., filed Oct. 28, 2014.
Final Office Action dated Apr. 13, 2016, for U.S. Appl. No. 14/165,256, of Aaron, P., filed Jan. 27, 2014.
Final Office Action dated Apr. 28, 2016, for U.S. Appl. No. 14/189,880, of Aaron, P., et al., filed Feb. 25, 2014.
Non-Final Office Action dated May 3, 2016, for U.S. Appl. No. 13/830,350, of Morgan, T. B., et al., filed Mar. 14, 2013.
Non-Final Office Action dated May 9, 2016, for U.S. Appl. No. 14/225,338, of Aaron, P., et al., filed Mar. 25, 2013.
Final Office Action dated May 20, 2016, for U.S. Appl. No. 14/329,658, of Aaron, P., et al., filed Jul. 11, 2014.
Non-Final Office Action dated Jun. 7, 2016, for U.S. Appl. No. 14/088,113, of Maxwell, D. W., et al., filed Nov. 22, 2013.
Non-Final Office Action dated Jun. 7, 2016, for U.S. Appl. No. 14/208,800, of Thome, J. P., et al., filed Mar. 13, 2014.
Non-Final Office Action dated Jun. 8, 2016, for U.S. Appl. No. 14/088,141, of Maxwell, D. W, et al., filed Nov. 22, 2013.
Non-Final Office Action dated Jun. 17, 2016, for U.S. Appl. No. 14/184,503, of Borovsky, A., et al., filed Feb. 19, 2014.
Final Office Action dated Jun. 17, 2016, for U.S. Appl. No. 14/149,754, of Spindel, N., et al., filed Jan. 7, 2014.
Final Office Action dated Jun. 20, 2016, for U.S. Appl. No. 13/829,658, of Morgan, T. B., et al., filed Mar. 14, 2013.
Non-Final Office Action dated Jul. 14, 2016, for U.S. Appl. No. 14/160,490, of Moring, D., et al., filed Jan. 21, 2014.
Final Office Action dated Jul. 18, 2016, for U.S. Appl. No. 14/189,869, of Lamba, K., et al., filed Feb. 25, 2014.
Non-Final Office Action dated Jul. 21, 2016, for U.S. Appl. No. 14/329,638, of Aaron, P., et al., filed Jul. 11, 2014.
Final Office Action dated Sep. 1, 2016, for U.S. Appl. No. 14/225,338, of Aaron, P., et al., filed Mar. 25, 2014.
Notice of Allowance dated Sep. 13, 2016, for U.S. Appl. No. 14/692,655, of Borovsky, A., et al., filed Apr. 21, 2015.
Advisory Action dated Sep. 21, 2016, for U.S. Appl. No. 13/829,658, of Morgan, T.B. et al., filed Mar. 14, 2013.
4dvisory Action dated Sep. 21, 2016, for U.S. Appl. No. 14/149,754, of Spindel, N., et al., filed Jan. 7, 2014.
Non-Final Office Action dated Sep. 21, 2016, for U.S. Appl. No. 14/189,880, of Aaron, P., filed Feb. 25, 2014.
Non-Final Office Action dated Jan. 20, 2017, for U.S. Appl. No. 14/168,274, of Odawa, A.W., et al., filed Jan. 30, 2014.
Advisory Action dated Feb. 24, 2017, for U.S. Appl. No. 14/526,361, of White, M.W., et al., filed Oct. 28, 2014.
Corrected Notice of Allowance dated Feb. 27, 2017, for U.S. Appl. No. 14/329,658, of Aaron, P., et al., filed Jul. 11, 2014.
Notice of Allowance dated Mar. 2, 2017, for U.S. Appl. No. 13/829,080, of Morgan, T.B., et al., filed Mar. 14, 2013.
Final Office Action dated Mar. 2, 2017, for U.S. Appl. No. 14/189,880, of Aaron, P., et al., filed Feb. 25, 2014.
Advisory Action dated Mar. 9, 2017, for U.S. Appl. No. 14/184,503, of Borovsky, A., et al., filed Feb. 19, 2014.
Non-Final Office Action dated Mar. 13, 2017, for U.S. Appl. No. 14/189,869, of Lamba, K., et al., filed Feb. 25, 2014.
Non-Final Office Action dated Mar. 15, 2017, for U.S. Appl. No. 13/829,658, of Morgan, T.B., et al., filed Mar. 14, 2013.
"Card Not Present Transaction," Wikipedia, published Mar. 4, 2014, Retrieved from the Internet URL: http://en.wikipedia.org/wiki/Card_not_present_transaction, on Jun. 6, 2014, pp. 1-2.
"Payment Gateway," Wikipedia, published May 30, 2014, Retrieved from the Internet URL: http://en.wikipedia.org/wiki/Pavment gateways, on Jun. 6, 2014, pp. 1-3.
"ProPay JAK Mobile Card Reader," Propay, published Dec. 27, 2011, Retrieved from the Internet URL: https://web.archive.org/web/20111227055421/https://www.propay.com/products-services/accept-payments/jak-card-reader, pp. 1-2.
"Verified by Visa Acquirer and Merchant Implementation Guide," U.S. Region, Visa Public, May 2011, pp. 1-114.
"Uber—Android Apps on Google Play," Published on Nov. 10, 2014, Retrieved from the Internet URL: https://play.google.com/store/apps/details?id=com.ubercab&h1=en, on Nov. 12, 2014, pp. 1-2.
Punch, L., "E-commerce: Just what does card-present mean these days," dated Oct. 1, 2012, Retrieved from the Internet URL: http://digitaltransactions.net/news/ story/ E-Commerce_-Just-What-Does-Card-Present-Mean-These-Days, on Feb. 17, 2015, pp. 1-4.
Non-Final Office Action dated Dec. 1, 2014, for U.S. Appl. No. 14/062,617, of Templeton, T., et al., filed Oct. 24, 2013.
Non Final Office Action dated Dec. 15, 2014, for U.S. Appl. No. 14/312,397, of Varma, A.K., et al., filed Jun. 23, 2014.
Final Office Action dated Apr. 16, 2015, for U.S. Appl. No. 14/062,617, of Templeton, T., et al., filed Oct. 24, 2013.
Final Office Action dated Aug. 31, 2015, for U.S. Appl. No. 14/312,397, of Varma, A.K., et al., filed Jun. 23, 2014.
Non-Final Office Action dated Jan. 14, 2016, for U.S. Appl. No. 14/312,397, of Varma, A.K., et al., filed Jun. 23, 2014.
Non-Final Office Action dated Feb. 23, 2016, for U.S. Appl. No. 14/062,617, of Templeton, T., et al., filed Oct. 24, 2013.
Non-Final Office Action dated May 5, 2016, for U.S. Appl. No. 14/312,397, of Varma, A.K., et al., filed Jun. 23, 2014.
Non-Final Office Action dated Aug. 10, 2016, for U.S. Appl. No. 14/312,433, of Varma, A.K., et al., filed Jun. 23, 2014.
Final Office Action dated Sep. 1, 2016, for U.S. Appl. No. 14/062,617, of Templeton, T., et al., filed Oct. 24, 2013.
Non-Final Office Action dated Sep. 8, 2016, for U.S. Appl. No. 14/312,371, of Varma, A.K., et al., filed Jun. 23, 2014.
Examination Report No. 1 for Australian Patent Application No. 2014302661, dated Sep. 27, 2016.
Non-Final Office Action dated Nov. 17, 2016, for U.S. Appl. No. 14/701,571, of Jen, M. et al., filed May 1, 2015.
Advisory Action dated Nov. 28, 2016, for U.S. Appl. No. 14/062,617, of Templeton, T., et al., filed Oct. 24, 2013.
Final Office Action dated Nov. 28, 2016, for U.S. Appl. No. 14/312,397, of Varma, A.K. et al., filed Jun. 23, 2014.
Examiner's Requisition for Canadian Patent Application No. 2,916,603, dated Feb. 9, 2017.
Notice of Allowance dated Mar. 23, 2017, for U.S. Appl. No. 14/701,571, of Jen, M., et al., filed May 1, 2015.

(56) References Cited

OTHER PUBLICATIONS

Advisory Action dated Apr. 10, 2017, for U.S. Appl. No. 14/312,397, of Varma, A.K., et al., filed Jun. 23, 2014.
Non-Final Office Action dated Apr. 18, 2017, for U.S. Appl. No. 14/160,490, of Moring, D., et al., filed Jan. 21, 2014.
Final Office Action dated Apr. 19, 2017, for U.S. Appl. No. 14/312,433, of Varma, A.K., et al., filed Jun. 23, 2014.
Final Office Action dated Apr. 27, 2017, for U.S. Appl. No. 14/312,371, of Varma, A.K., et al., filed Jun. 23, 2014.
Non-Final Office Action dated Jun. 19, 2017, for U.S. Appl. No. 14/730,860, of Sasmaz, Y., et al., filed Jun. 4, 2015.
Advisory Action dated Jun. 30, 2017, for U.S. Appl. No. 14/312,433, of Varma, A.K., et al., filed Jun. 23, 2014.
Non-Final Office Action dated Jul. 10, 2017, for U.S. Appl. No. 13/830,350, of Morgan, T.B., et al., filed Mar. 14, 2013.
Advisory Action dated Jul. 11, 2017, for U.S. Appl. No. 14/312,371, of Varma, A.K., et al., filed Jun. 23, 2014.
Examination Report No. 1 for Australian Patent Application No. 2015264426, dated Jul. 11, 2017.
International Search Report and Written Opinion for International Application No. PCT/US2014/043891, dated Dec. 10, 2014.
Examiner Requisition for Canadian Patent Application No. 2,930,186, dated Jan. 30, 2017.
Notice of Acceptance for Australian Patent Application No. 2014347192, dated Feb. 16, 2017.
Advisory Action dated Sep. 29, 2016, for U.S. Appl. No. 14/329,658, of Aaron, P., et al., filed Jul. 11, 2014.
Final Office Action dated Oct. 11, 2016, for U.S. Appl. No. 13/829,080, of Morgan, T.B., et al., filed Mar. 14, 2013.
Advisory Action dated Oct. 11, 2016, for U.S. Appl. No. 14/189,869, of Lamba, K., et al., filed Feb. 25, 2014.
Final Office Action dated Oct. 12, 2016, for U.S. Appl. No. 14/145,895, of Aaron, P., et al., filed Dec. 31, 2013.
Final Office Action dated Nov. 1, 2016, for U.S. Appl. No. 14/160,490, of Moring, D., et al., filed Jan. 21, 2014.
Notice of Allowance dated Nov. 08, 2016, for U.S. Appl. No. 14/225,338, of Aaron, P., et al., filed Mar. 25, 2014.
Final Office Action dated Nov. 10, 2016, for U.S. Appl. No. 13/830,350, of Morgan, T.B., et al., filed Mar. 14, 2013.
Final Office Action dated Nov. 14, 2016, for U.S. Appl. No. 14/526,361, of White, M.W., et al., filed Oct. 28, 2014.
Final Office Action dated Nov. 29, 2016, for U.S. Appl. No. 14/088,113, of Maxwell, D.W., et al., filed Nov. 22, 2013.
Final Office Action dated Nov. 30, 2016, for U.S. Appl. No. 14/208,800, of Thome, J.P. et al., filed Mar. 13, 2014.
Final Office Action dated Dec. 12, 2016, for U.S. Appl. No. 14/088,141, of Maxwell, D.W., et al., filed Nov. 22, 2013.
Advisory Action dated Dec. 22, 2016, for U.S. Appl. No. 14/145,895, of Aaron, P., et al., filed Dec. 31, 2013.
Final Office Action dated Dec. 27, 2016, for U.S. Appl. No. 14/184,503, of Borovsky, A., et al., filed Feb. 19, 2014.
Notice of Allowance dated Jan. 13, 2017, for U.S. Appl. No. 14/329,658, of Aaron, P., et al., filed Jul. 11, 2014.
Final Office Action dated Jan. 27, 2017, for U.S. Appl. No. 14/329,638, of Aaron, P., et al., filed Jul. 11, 2014.
Examination Report No. 1 for Australian Patent Application No. 2014347192, dated Dec. 15, 2016.
Munson, J., and Gupta, V.K., "Location-Based Notification as a General-Purpose Service," dated Sep. 28, 2002, Retrieved from the Internet URL—https://ai2-s2-pdfs.s3.amazonaws.com/1bb5/6ae0a70b030e2f2376ed246834bddcabd27b.pdf, pp. 40-44.
Final Office Action dated Aug. 10, 2017, for U.S. Appl. No. 14/160,490, of Moring, D., et al., filed Jan. 21, 2014.
Examination Report No. 2 for Australian Patent Application No. 2014302661, dated Sep. 26, 2017.
Advisory Action dated Oct. 31, 2017, for U.S. Appl. No. 14/160,490, of Moring, D., et al., filed Jan. 21, 2014.
Final Office Action dated Nov. 17, 2017, for U.S. Appl. No. 14/730,860, of Sasmaz, Y., et al., filed Jun. 4, 2015.
Notice of Allowance dated Nov. 24, 2017, for U.S. Appl. No. 13/829,658, of Morgan, T.B., et al., filed Mar. 14, 2013.
Non-Final Office Action dated Dec. 13, 2017, for U.S. Appl. No. 14/312,397, of Varma, A.K., et al., filed Jun. 23, 2014.
Non-Final Office Action dated Dec. 29, 2017, for U.S. Appl. No. 14/165,256, of Aaron, P., filed Jan. 27, 2014.
Examiner's Requisition for Canadian Patent Application No. 2,930,186, dated Jan. 11, 2018.
Final Office Action dated Jan. 22, 2018, for U.S. Appl. No. 13/830,350, of Morgan, T.B., et al., filed Mar. 14, 2013.
Examiner's Requisition for Canadian Patent Application No. 2,916,603, dated Feb. 15, 2018.

* cited by examiner

US 10,198,731 B1

PERFORMING ACTIONS BASED ON THE LOCATION OF MOBILE DEVICE DURING A CARD SWIPE

BACKGROUND

Payment card (e.g., credit card, debit card) fraud is a significant concern for many parties, including banks that issue payment cards, merchants that accept payment cards, and customers that obtain and use payment cards to pay for purchases and other financial transactions. Criminals are able to counterfeit a payment card given the right information, and the information is often not difficult for the thieves to obtain. News media reports of thousands, and even millions, of payment cards being stolen from companies by criminals that are able to break into the companies' computer networks are alarmingly common. The criminals can counterfeit a payment card using this stolen payment card information, or can simply sell the payment card information to other criminals who will counterfeit the payment card. Payment card information can be stolen as simply as by a waiter or waitress at a restaurant swiping a customer's payment card through a personal card reader the size of an ice cube after the customer provides the payment card to pay for a meal. Criminals can use this information to counterfeit a payment card, and can use the payment card to make a fraudulent purchase or to pay for a fraudulent financial transaction.

BRIEF DESCRIPTION OF THE DRAWINGS

Embodiments of the present invention will be described and explained through the use of the accompanying drawings in which.

DETAILED DESCRIPTION

Figure 1:
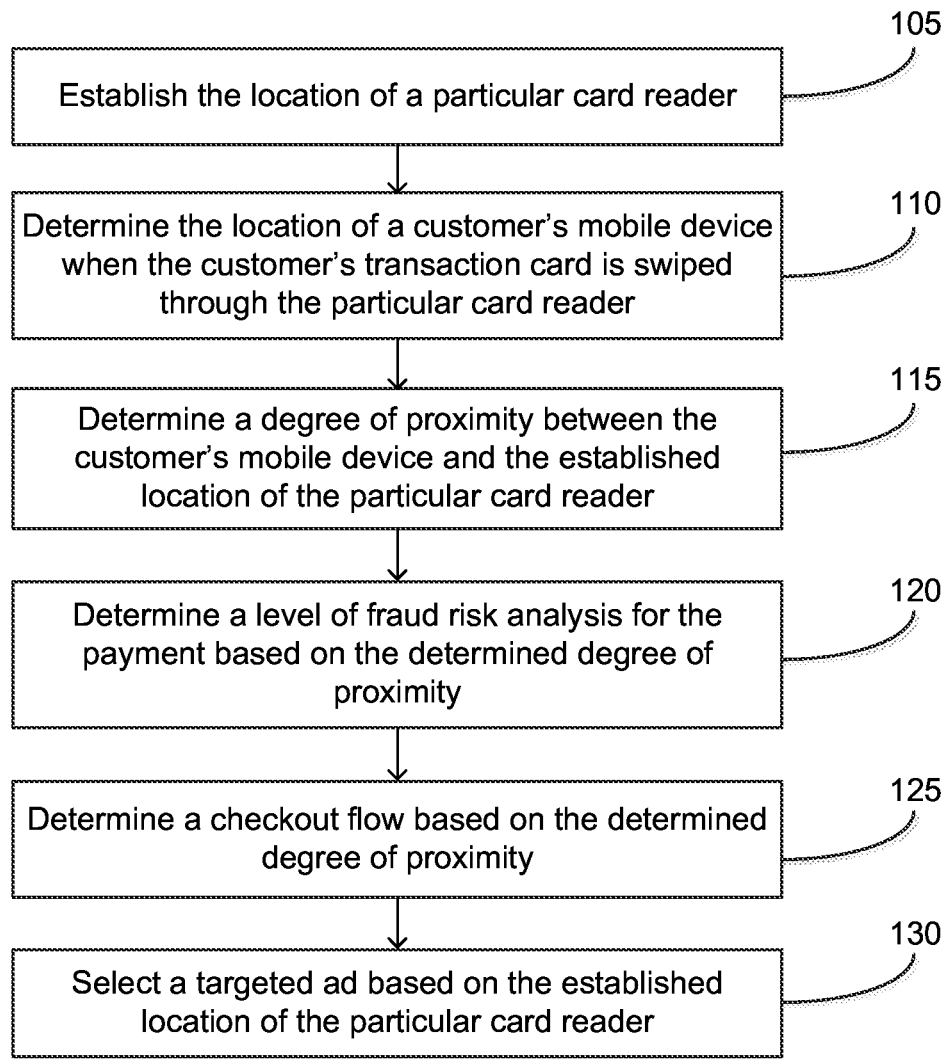
FIG. 1 is a high-level flow diagram of operations that can be performed by a computer system based on an established location of a card reader.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Introduced here is a technique related to basing actions on a location of a mobile device during a card swipe of a payment object, such as a credit card or a debit card. When a customer's mobile device is located near the location of a card swipe or at the same place of business as where the card swipe occurs, there is a high likelihood that the customer is involved in the card swipe, and a corresponding low likelihood that the card swipe is associated with a fraudulent transaction. Conversely, when the customer's mobile device is located at a different location than a card swipe, there is an increased likelihood that the customer is not involved in the card swipe and a corresponding increased likelihood that the purchase transaction is fraudulent. Therefore, for example, an action such as a fraud screening process can be based on the location of the customer's mobile device at the time of a swipe of a payment card belonging to the customer.

The term "swipe" here refers to any manner of triggering a card reader to read a card, such as passing a card through a magnetic stripe reader, smartcard reader, optical code reader, radio frequency identification (RFID) reader, etc. A payment card is one type of payment object. The term "payment object" here refers to any object that can be used to make an electronic payment, such as a mobile device via a digital wallet application, an object containing an optical code such as a quick response (QR) code, etc. The term "card reader" here refers to any object that can be used to obtain information from an object used to make an electronic payment where the card reader must be in the general vicinity of the object, such as an optical scanner, a near field communications device, a Bluetooth communications device, etc. The term "cause" and variations thereof, as used herein, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed.

In a first example scenario, a customer brings merchandise to a check-out stand of a merchant, and uses a payment card, such as a credit card, to pay for the purchase. The payment card is swiped through a particular card reader coupled to a point-of-sale (POS) system of the merchant, and the POS system sends the payment card information to a remote computer system as part of the payment card authorization process. The computer system, during the authorization process, sends a message to the customer's smartphone requesting location information, and the smartphone sends its location information to the computer system in response to the request. Because these communications all happen within a relatively short period of time (e.g., a few seconds or less), the location reported by the smartphone is its approximate location during the card swipe.

Based on the reported location of the smartphone, an action is taken. When the smartphone is located near the geographic location where the card swipe occurs, or when the smartphone is located at the same place of business as the card reader, a determination is made to use a lower level of fraud screening for the purchase transaction because of the increased likelihood that the customer is involved in the card swipe. That is, the likelihood that a criminal is attempting to use a counterfeit copy of the payment card in connection with that transaction is greatly reduced, and a lower level of fraud screening can be used.

Further, this enables the usage of a streamlined checkout process, with the lower level of fraud screening resulting in fewer steps during the streamlined checkout process. Conversely, when the smartphone is at a different location during the card swipe, the risk that someone other than the customer is using the payment card is increased. That is, the likelihood that a criminal is attempting to use a counterfeit copy of the payment card in connection with that transaction is increased. Resultantly, a higher level of fraud screening can be used.

In a second example scenario, a customer brings merchandise to a check-out stand of a merchant, and uses a payment card, such as a credit card, to pay for the purchase. The payment card is swiped through a particular card reader coupled to a POS system of the merchant, and the POS system sends transaction information including identifying information for the merchant to a remote computer system as part of the payment card authorization process. The computer system establishes the location of the card reader as being at a place of business of the merchant based on the identifying information for the merchant. Using the established card reader location, the computer system subsequently determines whether the customer's smartphone is at the card reader location during the card swipe of the customer's payment card through the particular card reader.

For example, the computer system, during the authorization process, sends a message to the customer's smartphone requesting location information, and the smartphone sends its location information to the computer system in response to the request. The computer system determines, based on global positioning system (GPS) coordinates sent by the mobile device, that the mobile device is within a geo-fence associated with the merchant, and that the smartphone is at a place of business of the merchant.

A geo-fence is a pre-defined boundary, which can be, for example, circular, square, rectilinear, irregular in shape, etc. A geo-fence can define a location of a place of business of a merchant, such as with a geo-fence the borders of which track the outside walls of the merchant's place of business, or a circle the center of which is located inside the merchant's place of business and the radius of which corresponds to the size of the place of business.

When the smartphone is located within a certain proximity of the particular card reader during the card swipe, such as within a certain distance of the particular card reader or at the same merchant as the card reader, the presence of the customer at the merchant location is established with high confidence. Based on the location of the smartphone establishing with high confidence that the customer is at the merchant during the card swipe, a lower level of fraud screening and a streamlined checkout process are used.

To facilitate the technique, the location of a card reader can first be established. In a first example, a computer system has a database that associates a payment card of a customer with the customer's mobile device, such as a smartphone, the customer having previously logged in to a website to create the association. When the customer's payment card is swiped through a particular card reader of a POS system, the POS system communicates with the computer system as part of processing a payment. The computer system obtains contact information for the customer's mobile device from the database, and sends a message to the smartphone requesting location information, which the mobile device sends. After a number of other customers' mobile devices report a similar location during a card swipe at the particular card reader, the location of the particular card reader can be established at the geographic location reported by the mobile devices.

In a second example, when the customer's payment card is swiped through a particular card reader of a POS system of a merchant, the POS system communicates with the computer system as part of processing a payment. As part of the communication, the POS system sends an indication of the identity of the merchant, such as by sending a unique identification number associated with the merchant. The location of the card reader can be established as at a place of business of the merchant based on the indication of the identity of the merchant.

Once the location of the card reader is established, targeted ads can be served to the customer's mobile device based on the established location of the card reader, even when the customer's smartphone is unable to provide location information. For example, a customer may have location services disabled on his smartphone. With the location services disabled, the computer system is not able to obtain location information from the smartphone. However, when the customer makes a purchase at the merchant and his payment card is swiped through a particular card reader whose geographic location has been established, the computer system knows that the customer is likely located near the card reader, as the customer is likely involved in the card swipe. Targeted ads can therefore be sent to the customer's smartphone at that time, with the targeting based on the likelihood that the customer is located near the card reader, despite the absence of location information from the smartphone.

In the following description, the example of a financial transaction involving a merchant selling goods to a customer is presented, for illustrative purposes only, to explain various aspects of the technique. Note, however, that the technique introduced here is not limited in applicability to financial transactions, or to merchants and customers or to the sales of goods. The technique can be utilized with essentially any transaction that traditionally would be initiated by or involve the use of a card reader, such as checking out a library book using a library card that is read by a card reader. Further, while the specification uses the term "sale", as in point-of-sale (POS) for example, "sale" refers to any type of payment-oriented transaction, including for example a lease, a rental, or services, and is not limited to an actual purchase. Note also that in this description the terms "customer" or "payer" generally refer to the person making the payment related to the transaction, while "merchant" or "payee" generally refer to the person receiving the payment related to the transaction.

FIG. 1 is a high-level flow diagram of operations that can be performed by a computer system based on an established location of a card reader. The high-level level flow diagram will be explained in further detail in the flow diagrams of FIGS. 2-5. The process begins with step 105, where the computer system establishes the location of a particular card reader. In some embodiments, the location of the card reader can be established based on the identity of the merchant associated with the card reader. For example, the card reader is associated with a POS system of a merchant. When the POS system sends the transaction information associated with a card swipe, the POS system also sends identifying information for the merchant. For example, the POS system may send a unique identifier for the merchant, and based on unique identifier, the computer system establishes that the card reader is located at the merchant (i.e., at a place of business of the merchant).

A payment card can be, for example, a magnetic stripe card, a smart card including an embedded integrated circuit, a proximity card, a re-programmable magnetic stripe card, or a card containing an optical code such as a quick response (QR) code or a bar code. In other embodiments, the location of the card reader can be established by obtaining location information from multiple customers' mobile devices when the customers' payment cards are swiped through the particular card reader to make a payment. Step 105 is explained in more detail in the discussion below of steps 215-235 of FIG. 2B, and steps 250-255 of FIG. 2A.

The transactions of this example are financial transactions involving the sale of goods by a merchant to a customer. However, as discussed above, the technique introduced here is not limited to financial transactions. Multiple customers shop at the merchant's place of business, select goods to purchase, and take the goods to a POS system, such as POS system 651 of FIG. 7, where payment cards of each of the customers is swiped to pay for the goods. During the payment authorization process for each of the multiple payments, a remote computer system communicates with the customer's mobile device and causes the mobile device to send location information to the computer system. After a sufficient number of mobile devices all report nearly the same location (e.g., within some predetermined margin of error), as is represented by label 705 of FIG. 7, the location of the particular card reader can be approximated. For example, the location can be approximated by determining the center of mass of the reported locations with nearly the same location, as is represented by label 720 of FIG. 7. The location of the card reader can established at the approximated location, or at the location of one of the reported locations with nearly the same location.

Next, at step 110 the computer system determines the location of a customer's mobile device when the customer's transaction card is swiped through the particular card reader. Step 110 is explained in more detail in the discussion of steps 315-330 of FIG. 3. In some embodiments, the transaction card is a payment card and the payment card is swiped using the particular card reader. The computer system communicates with the customer's mobile device during the authorization process for the payment and causes the mobile device to send location information to the computer system (e.g., as determined by a global positioning system (GPS) module in the mobile device). Because the time duration of the authorization process is relatively short (e.g., a few seconds), it can be reasonably assumed that the received location information is in fact the location of the customer's mobile device at the time of the card swipe. Therefore, the computer system determines the location of the customer's mobile device during the card swipe based on the received location information. In some embodiments, the location information does not specify a geographic location of the mobile device, but rather a location of the mobile device at a place of business. For example, the mobile device can determine based on wireless communications that the mobile device is located at a merchant. More specifically, the mobile device can determine that it is located at a particular merchant based on the service set identifier (SSID) of a Wi-Fi network of the merchant, or based on near field communications with a POS system of the merchant.

In some embodiments, the transaction card is an identification card, such as a driver's license, and the transaction card is swiped using the particular card reader. As part of an identity verification process, the card reader sends the identification information obtained from the identity card to the computer system. The computer system communicates with the customer's mobile device and causes the mobile device to send location information to the computer system, as described above. Note that the transaction card can be other types of cards, and that the method can work with these other types of cards.

Next, at step 115 the computer system determines a degree of proximity between the customer's mobile device and the particular card reader. Step 115 is explained in more detail in the discussion of step 335 of FIG. 3. In this high-level example, the computer system determines the degree of proximity by comparing the location of the card reader as established in step 105 with the information location received from the customer's mobile device. The degree of proximity can be determined, for example, by determining the distance between these two locations, or by determining if both locations are at the merchant.

Next, at step 120 the computer system determines a level of fraud risk analysis for the payment based on the determined degree of proximity. Step 120 is explained in more detail in the discussion of step 340 of FIG. 3. When the determined degree of proximity indicates that the customer's mobile device is located near the card reader or at the same merchant as the card reader, the likelihood that someone other than the customer is using the payment card or the identification card is relatively low. In such cases, the computer system determines to use a reduced level of fraud analysis for the payment authorization or identity verification process. Conversely, when the determined degree of proximity indicates that the customer's mobile device is located at a location not near the card reader or is not at the merchant at which the card reader is located, the likelihood that someone other than the customer is using the payment card is higher. In such cases, the computer system determines to use a higher level of fraud analysis for the payment authorization or identity verification process.

Next, at step 125 the computer system determines a checkout flow based on the determined degree of proximity. Step 125 can be performed after step 115. Step 125 is discussed in more detail in the discussion of step 355 of FIG. 3. The checkout flow is the process that is executed by the POS system as part of a payment transaction. When the determined degree of proximity indicates that the customer's mobile device is located near the card reader or is located at the same merchant as the card reader, the computer system determines to use a streamlined checkout flow for the customer's purchase transaction. For example, the flow can be streamlined by reducing the steps required as part of the transaction, such as by not obtaining the customer's signature, or not checking the customer's identification.

Next, at step 130 the computer system selects a targeted ad based on the established location of the particular card reader. Step 130 can be performed after steps 115 or 120. Step 130 is discussed in more detail in the discussion of step 425 of FIG. 4. In some cases, a customer may have location services disabled on his mobile device, so the computer system may not be able to receive location information from the customer's mobile device at the time of the card swipe. However, because the location of the card reader was previously established, and because it is likely that the customer is located near the card reader or at the same merchant as the card reader during the card swipe, the computer system can select a targeted ad to send to the customer's mobile device based on the established location of the particular card reader.

Figure 2A:
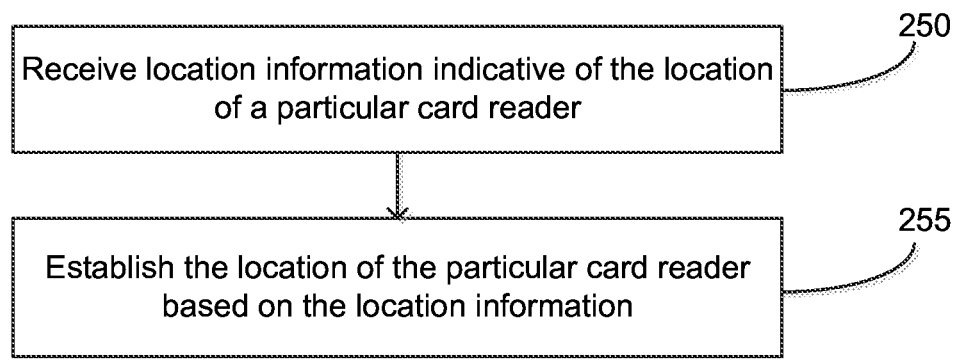
FIG. 2A is a flow diagram illustrating a first example of a process that can be performed by a computer system for establishing the location of a card reader.

FIG. 2A is a flow diagram illustrating a first example of a process that can be performed by a computer system for establishing the location of a card reader. The process starts at step 250 with a computer system, such as computer system 670 or 671, receiving location information indicative of the location of a particular card reader. In some embodiments, the location information is a unique identifier that is associated with the merchant that is sent by a POS system, such as POS system 650 or 651. In some embodiments, the location information is GPS coordinates of a location corresponding to the location of the card reader. For example, POS system 651 can contain a GPS module and send the GPS coordinate as determined by the GPS module to computer system 670. Next, at step 255 the computer system establishes the location of the card reader as at the merchant. When the location information is a unique identifier that is associated with the merchant, the computer system establishes the location of the card reader as being at the merchant. When the location information is a GPS coordinate, the computer system can determine that the GPS coordinate is within a geo-fence associated with the merchant, or can determine that the GPS is associated with the merchant based on a mapping service such as Google Maps®. The computer system can establish the location of the card reader based on the GPS coordinate, and can establish the location of the card reader as being at the merchant.

Figure 2B:
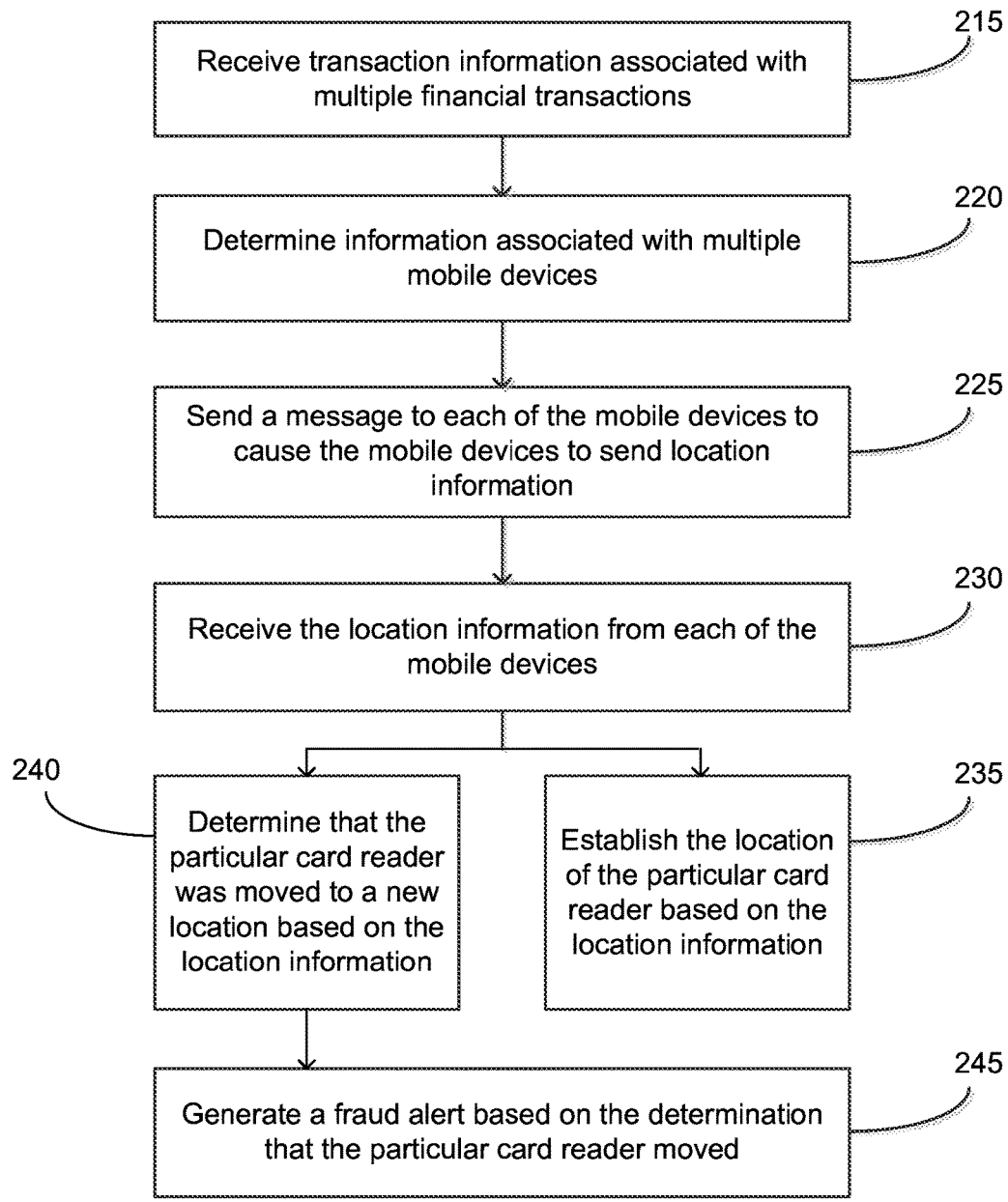
FIG. 2B is a flow diagram illustrating a second example of a process that can be performed by a computer system for establishing the location of a card reader.
Figure 6:
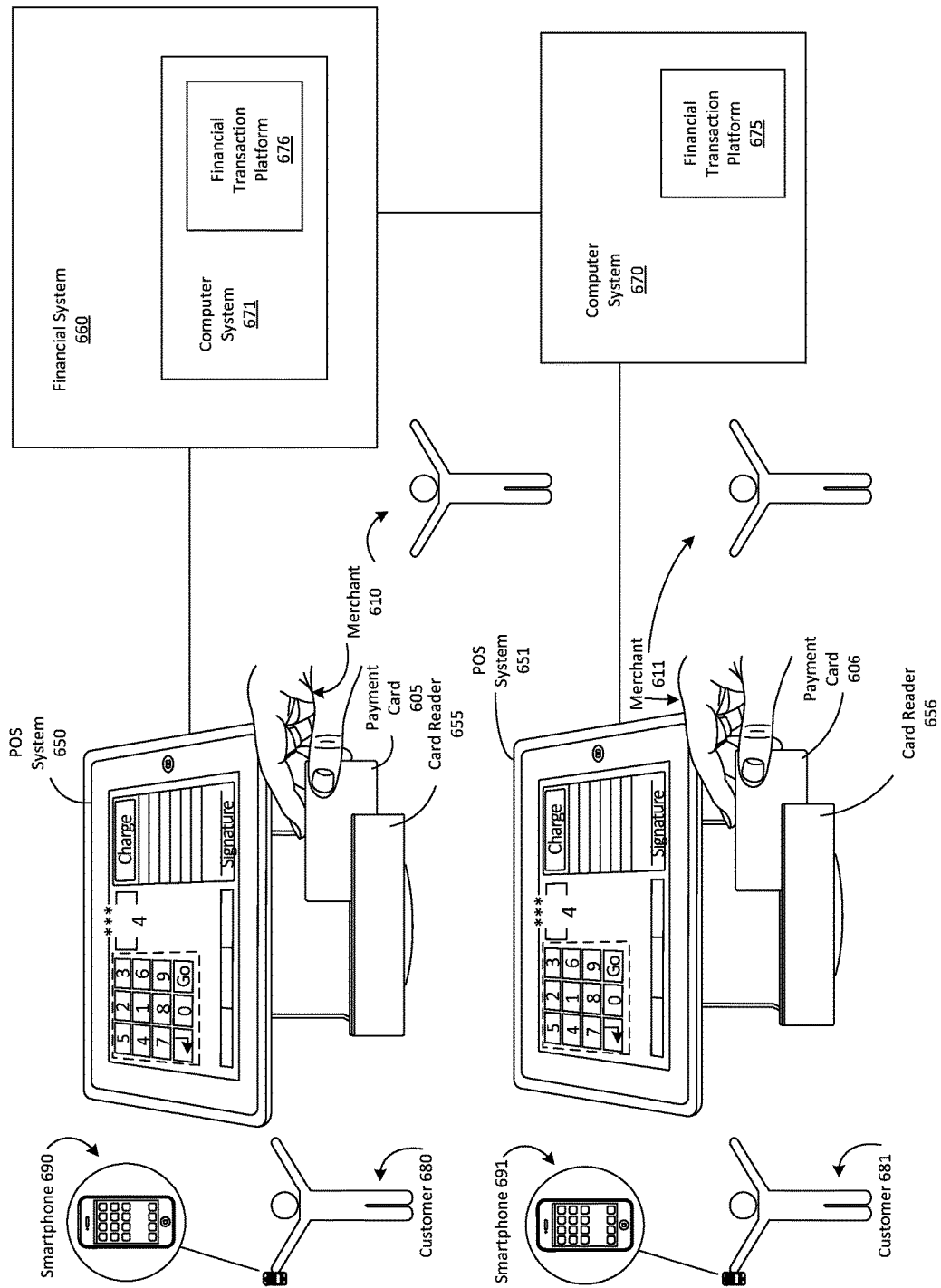
FIG. 6 is an environment in which the techniques introduced here can be implemented.

FIG. 2B is a flow diagram illustrating a second example of a process that can be performed by a computer system for establishing the location of a card reader. This example process will be explained using the example environment of FIG. 6, and will refer to labels of that figure. Different variations of the process of FIG. 2B will be explained in relation to three examples. In the first example, POS system 651 is coupled to computer system 670 and/or financial transaction platform 675, as depicted in FIG. 6. POS system 650, financial system 660, computer system 671, and financial transaction platform 676 need not be involved in this example. At step 215, computer system 670 and/or financial transaction platform 675 receive transaction information associated with multiple financial transactions from POS system 651. In this example, multiple financial transactions are initiated between multiple customers and merchant 611. The financial transactions involve the sale of goods by merchant 611 to the multiple customers, including customer 681, using POS system 651. The customers shop at the merchant 611's place of business, select goods to purchase, and take the goods to POS system 651. As part of the purchase process, the merchant rings up the goods using POS system 651, such as by scanning bar codes on the goods with a scanner coupled to the POS system.

After all the goods are rung up, POS system 651 calculates the total amount of the purchase. Each customer provides a payment card, and the payment card is swiped through card reader 656, such as by either the customer or merchant 611. POS system 651 sends the transaction information associated with the multiple transactions, and computer system 670 and/or financial transaction platform 675 accordingly receive the transaction information. After the payment card provided by one of the multiple customers is swiped, card reader 656 obtains information from the payment card, such as by reading the magnetic strip on the back of a credit card. In some embodiments, various information, such as the information from the payment card, the transaction information, and information regarding the merchant, is sent by POS system 651 to computer system 670 and/or financial transaction platform 675, which can be implemented on computer system 670. The information from the payment card is referred to herein as the payment card information. The transaction information includes the amount of the payment, and can additionally include a listing of items associated with the financial transaction, such as the listing of the goods rung up by the POS system, as well as information regarding the merchant. The various information is accordingly received by computer system 670 and/or financial transaction platform 675.

In some embodiments, the payment card is a proxy card. A proxy card is a payment card that can be associated with multiple payment accounts. In some embodiments, the proxy card is a software proxy card with the association between the proxy card and the multiple payment accounts maintained by a server computer. In some embodiments, the proxy card is a hardware proxy card, with the association between the proxy card and the multiple payment accounts stored in non-volatile storage of the proxy card. For example, a proxy card, which can be a magnetic stripe card similar to a credit card, is associated with a payment account that is associated with a credit card, a payment account that is associated with a debit card, a payment account that is associated with an ATM card, and a payment account that is associated with a pre-paid gift card. In this example, the proxy card is a software proxy card. The proxy card is swiped by card reader 656, and POS system 651 sends the various information to computer system 670 and/or financial transaction platform 675.

Next, at step 220 computer system 670 and/or financial transaction platform 675 receive information associated with mobile devices associated with the authorized users of the cards used in the above-mentioned transactions. An example of such a mobile device is a smartphone 691. Computer system 670 and/or financial transaction platform 675 determine information associated with the multiple mobile devices of the cardholders. Computer system 670 and/or financial transaction platform 675 have access to a database containing information associated with payment cards. The database contains, for example, contact information, such as phone numbers or internet protocol (IP) addresses, of mobile devices that are associated with the payment cards. Computer system 670 and/or financial transaction platform 675 determine the information associated with the multiple mobile devices by accessing the database to obtain the contact information associated with the mobile devices.

Figure 7:
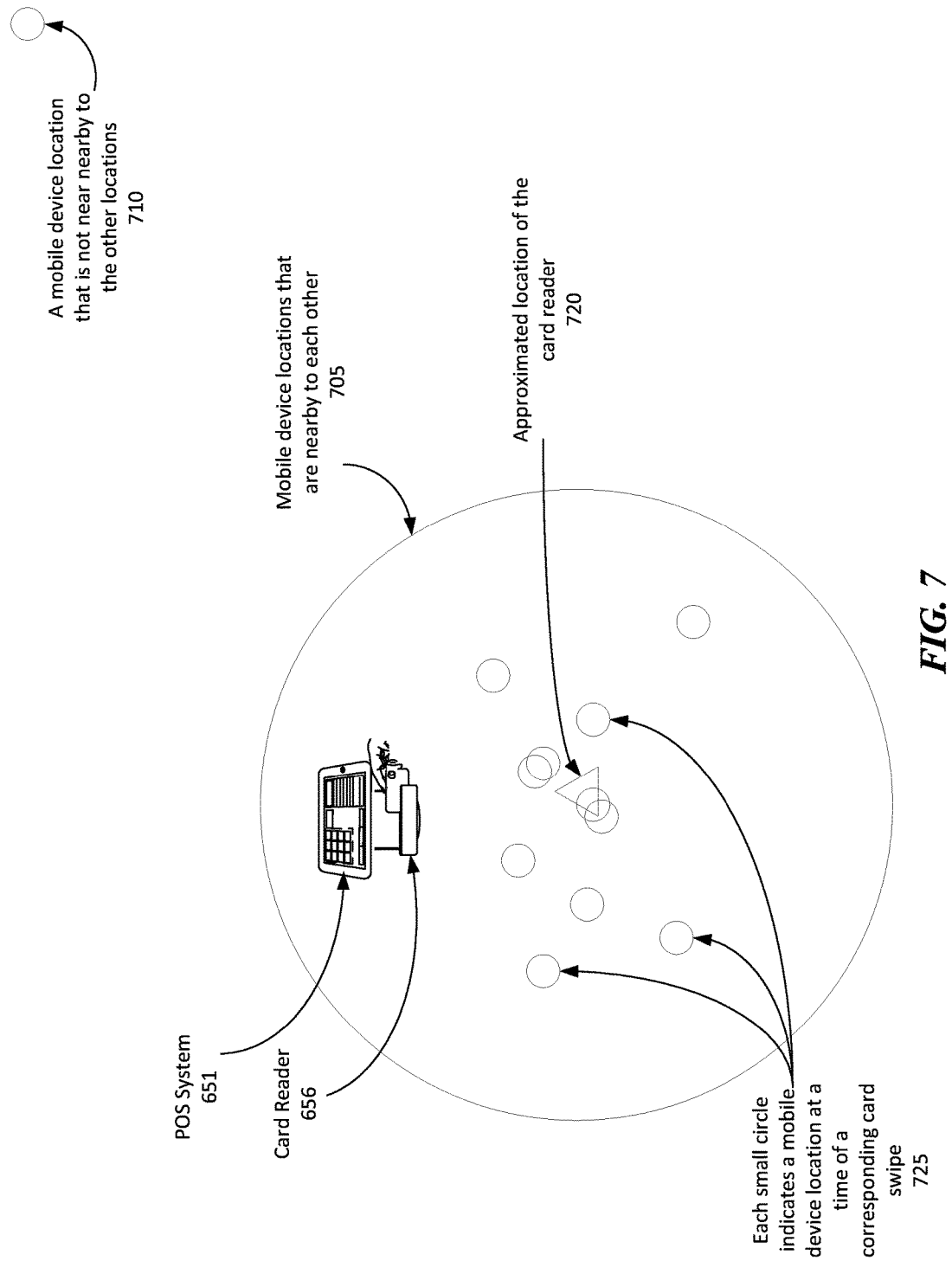
FIG. 7 is an illustration of mobile device locations at a time of a corresponding card swipe.

Next, at step 225 computer system 670 and/or financial transaction platform 675 send a message to each of the mobile devices to cause the mobile devices to send location information. Computer system 670 and/or financial transaction platform 675, having contact information for the mobile devices, sends a message to each of the mobile devices to cause the mobile devices to send their location information to the computer system. The message can be sent in via an IP message, a text message (e.g., card message service (SMS) message), an email, etc. The mobile device, in response to the received message, determines its geographical location, such as based on the location as determined by a GPS module associated with the mobile device. The mobile device, also in response to the received message, sends the location information to computer system 670 and/or financial transaction platform 675. FIG. 7 depicts the geographic location of POS system 651 and card reader 656, along with the locations of the mobile devices (see labels 710 and 725) when the corresponding card swipes happen.

Next, at step 230 computer system 670 and/or financial transaction platform 675 receive the location information from each of the mobile devices. Computer system 670 and/or financial transaction platform 675 receive the location information that was sent by the mobile devices during step 225. Next, at step 235 computer system 670 and/or financial transaction platform 675 establish the location of the particular card reader based on the location information. Computer system 670 and/or financial transaction platform 675 establish the location of card reader 656 based on the location information that was received during step 230. In some cases, when the payment card is swiped through card reader 656 during step 210, the mobile device associated with the payment card may be located at a location different from that of the card reader 656, as is illustrated by label 710 of FIG. 7. This may be because, for example, the customer left his mobile device at a different location, such as his home or his car, or lent his mobile device to another person who is at a different location at the time of the card swipe. As a result, computer system 670 and/or financial transaction platform 675 can receive location information indicating a number of different locations, as is depicted in FIG. 7. However, the location information compiled from multiple transactions over time will generally indicate that a large number of mobile devices were at very nearly the same location during corresponding card swipes2 as is illustrated by label 705 of FIG. 7. Once the location information from a sufficient number of mobile devices all indicate substantially the same location, computer system 670 and/or financial transaction platform 675 can approximate the location of card reader 656, as is illustrated by label 720 of FIG. 7. The location of card reader 656 can be established at the approximated location 720 of card reader 656.

Next, at step 240 computer system 670 and/or financial transaction platform 675 determine that the particular card reader was moved to a new location based on the location information. Steps 205-230 are continuously repeated, even after the location of the particular card reader is established, as each new customer purchases goods and makes a payment using the particular card reader. The merchant, at a certain point in time, may move POS system 651, including card reader 656, to a new location. Computer system 670 and/or financial transaction platform 675 determines that the percentage of mobile devices that are located near card reader 656 when an associated payment card is swiped drops to near zero.

At this point, computer system 670 and/or financial transaction platform 675 analyze the location information and determine that, after a certain point of time, a large number of mobile devices indicated very nearly the same location, but the location is different from the earlier established location of card reader 656. Based on this new location information data, computer system 670 and/or financial transaction platform 675 establish that card reader 656 was moved to a new location, and also establish that new location as the location of the card reader, based on the new location information data.

Next, at step 245 computer system 670 and/or financial transaction platform 675 generate a fraud alert based on the determination that the particular card reader moved. For example, computer system 670 and/or financial transaction platform 675 generate a fraud alert indicating that card reader 656 may have been stolen.

The second example covers steps 205-235 for a scenario where the computer system is part of a financial system. In the second example, POS system 650 is coupled to computer system 671 and/or financial transaction platform 676 via financial system 660, as is depicted in FIG. 6. POS system 651, computer system 670, and financial transaction platform 675 need not be involved in this example. This example begins at step 215, where computer system 671 and/or financial transaction platform 676 receive transaction information associated with multiple financial transactions from POS system 650 via financial system 660. In this example, multiple financial transactions are initiated between multiple customers and merchant 610. The financial transactions involve the sale of goods by merchant 610 to the multiple customers, including customer 680, using POS system 650. The customers shop at the merchant 610's place of business, select goods to purchase, and take the goods to POS system 650. As part of the purchase process, the merchant rings up the goods using POS system 650, such as by scanning bar codes on the goods with a scanner coupled to the POS system.

After all the goods are rung up, POS system 650 calculates the total amount of the purchase. Each customer provides a payment card, and the payment card is swiped through card reader 655, such as by either the customer or merchant 610. POS system 650 sends the transaction information associated with the multiple transactions, and computer system 671 and/or financial transaction platform 676 accordingly receive the transaction information via financial system 660. After the payment card provided by one of the multiple customers is swiped, card reader 655 obtains information from the payment card, such as by reading the magnetic strip on the back of a credit card. In some embodiments, various information, such as the information from the payment card, the transaction information, and information regarding the merchant, is sent by POS system 650 to computer system 671 and/or financial transaction platform 676, which can be implemented on the computer system 671, via financial system 660. The transaction information includes the amount of the payment, and can additionally include a listing of items associated with the financial transaction, such as the listing of the goods rung up by the POS system, as well as information regarding the merchant. The various information is accordingly received by computer system 671 and/or financial transaction platform 676.

Financial system 660 can process electronic payments, such as a payment made using a payment card, and can transfer funds related to the electronic payments, such as from an account associated with the payment card to an account associated with the payee. Financial system 660 can include processing services, such as Bank of American Merchant Services, financial services, such as VISA's VisaNet Payment System, and banking services, such as Chase Bank. A person having ordinary skill in the art will appreciate that there are many possible financial systems. Computer system 671 and/or financial transaction platform 676 are part of financial system 660, and the various information sent to financial system 660 is received by computer system 671 and/or financial transaction platform 676. In some embodiments, computer system 671 and/or financial transaction platform 676 is controlled by a processing service. In some embodiments, computer system 671 and/or financial transaction platform 676 is controlled by a financial service. In some embodiments, computer system 671 and/or financial transaction platform 676 is controlled by a banking service.

The payment card can be a proxy card. The proxy card is swiped by card reader 655, and POS system 650 sends the various information to financial system 660, where it can be received by computer system 671 and/or financial transaction platform 676. In some embodiments, the various information including the proxy card information is received by a processing service, and the processing service relays the various information to computer system 671 and/or financial transaction platform 676. In some embodiments, the various information including the proxy card information is received by a processing service, the processing service relays the various information to a financial service, and the financial service relays the various information to computer system 671 and/or financial transaction platform 676.

Next, at step 220 computer system 671 and/or financial transaction platform 676 determine information associated with multiple mobile devices. Computer system 671 and/or financial transaction platform 676 determine the information associated with the multiple mobile devices, an example of a mobile device being smartphone 690. Computer system 671 and/or financial transaction platform 676 have access to a database containing information associated with payment cards. The database contains, for example, contact information, such as phone numbers or IP addresses, of mobile devices that are associated with the payment cards. Computer system 671 and/or financial transaction platform 676 determine the information associated with the multiple mobile devices by accessing the database to obtain the contact information associated with the mobile devices.

Next, at step 225 computer system 671 and/or financial transaction platform 676 send a message to each of the mobile devices to cause the mobile devices to send location information. Computer system 671 and/or financial transaction platform 676, having contact information for the mobile devices, send a message to each of the mobile devices to cause the mobile devices to send location information. The message can be sent in via an IP message, a text message, an email, etc. The mobile device, in response to the received message, determines its geographical location, such as based on the location as determined by a GPS module associated with the mobile device. The mobile device, also in response to the received message, sends the location information to computer system 671 and/or financial transaction platform 676.

Next, at step 230 computer system 671 and/or financial transaction platform 676 receive the location information from each of the mobile devices. Computer system 671 and/or financial transaction platform 676 receive the location information that was sent by the mobile devices during step 225. Next, at step 235 computer system 671 and/or financial transaction platform 676 establish the location of the particular card reader based on the location information. Computer system 671 and/or financial transaction platform 676 establish the location of card reader 655 based on the location information that was received during step 230. In some cases, when the payment card is swiped through card reader 655 during step 210, the mobile device associated with the payment card is located at a different location than card reader 655. This is because, for example, the customer left his mobile device at a different location, such as his home or his car, or lent his mobile device to another person who is at a different location at the time of the card swipe. As a result, computer system 671 and/or financial transaction platform 676 can receive location information indicating a number of different locations. However, the location information will indicate that a large number of mobile devices are at very nearly the same location. Once the location information from a sufficient number of mobile devices all indicate substantially the same location, computer system 671 and/or financial transaction platform 676 can establish the location of card reader 655 at that location.

The third example covers steps 205-235 for a scenario where a software proxy card is used, the POS system sends the information to a financial system, and the computer system is not part of the financial system. In the third example, POS system 650 is coupled to computer system 670 and/or financial transaction platform 675 via financial system 660, as is depicted in FIG. 6. Computer system 671 and financial transaction platform 676 need not be involved in this example. This example begins at step 215, where computer system 670 and/or financial transaction platform 675 receive transaction information associated with multiple financial transactions from POS system 650 via financial system 660. In this example, multiple financial transactions are initiated between multiple customers and merchant 610. The financial transactions involve the sale of goods by merchant 610 to multiple customers, including customer 680, using POS system 650. The customers shop at the merchant 610's place of business, select goods to purchase, and take the goods to POS system 650. As part of the purchase process, the merchant rings up the goods using POS system 650, such as by scanning bar codes on the goods with a scanner coupled to the POS system.

After all the goods are rung up, POS system 650 calculates the total amount of the purchase. Each customer provides a payment card, and the payment card is swiped through card reader 655, such as by either the customer or merchant 610. POS system 650 sends the transaction information associated with the multiple transactions, and computer system 670 and/or financial transaction platform 675 accordingly receive the transaction information via financial system 660. After the payment card, in this example a software proxy card, provided by one of the multiple customers is swiped, card reader 655 obtains information from the payment card, such as by reading the magnetic strip on the back of the proxy card. In some embodiments, various information, such as the information from the payment card, the transaction information, and information regarding the merchant, is sent by POS system 650 to financial system 660. Financial system 660 can include processing services, such as Bank of American Merchant Services, financial services, such as VISA's VisaNet Payment System, and banking services, such as Chase Bank. A person having ordinary skill in the art will appreciate that there are many possible financial systems.

Financial system 660, based on the various information, determines to relay the various information to computer system 670 and/or financial transaction platform 675. The various information includes proxy card information, and the proxy card information includes meta-data that financial system 660 uses to determine to relay the various information. For example, the meta-data can indicate to forward the data to computer system 670 and/or financial transaction platform 675 by including a command instructing financial system 660 to forward the various information. The meta-data can include the IP address of or phone number associated with computer system 670 as the forwarding destination, among other ways of providing the forwarding destination. In one embodiment, a financial service, such as VISA's VisaNet Payment System, makes the determination based on the meta-data to relay the various information to computer system 670 and/or financial transaction platform 675.

Next, at step 220 computer system 670 and/or financial transaction platform 675 determine information associated with multiple mobile devices. Computer system 670 and/or financial transaction platform 675 determine the information associated with the multiple mobile devices, an example of a mobile device being smartphone 690. Computer system 670 and/or financial transaction platform 675 have access to a database containing information associated with payment cards. The database contains, for example, contact information, such as phone numbers or IP addresses, of mobile devices that are associated with the payment cards. Computer system 670 and/or financial transaction platform 675 determine the information associated with the multiple mobile devices by accessing the database to obtain the contact information associated with the mobile devices.

Next, at step 225 computer system 670 and/or financial transaction platform 675 send a message to each of the mobile devices to cause the mobile devices to send location information. Computer system 670 and/or financial transaction platform 675, having contact information for the mobile devices, send a message to each of the mobile devices to cause the mobile devices to send location information. The message can be sent in via an IP message, a text message, an email, etc. The mobile device, in response to the received message, determines its geographical location, such as based on the location as determined by a GPS module associated with the mobile device. The mobile device, also in response to the received message, sends the location information to computer system 670 and/or financial transaction platform 675.

Next, at step 230 computer system 670 and/or financial transaction platform 675 receive the location information from each of the mobile devices. Computer system 670 and/or financial transaction platform 675 receive the location information that was sent by the mobile devices during step 225. Next, at step 235 computer system 670 and/or financial transaction platform 675 establish the location of the particular card reader based on the location information. Computer system 670 and/or financial transaction platform 675 establish the location of card reader 655 based on the location information that was received during step 230. In some cases, when the payment card is swiped through card reader 655 during step 210, the mobile device associated with the payment card is located at a different location than card reader 655. This is because, for example, the customer left his mobile device at a different location, such as his home or his car, or lent his mobile device to another person who is at a different location at the time of the card swipe. As a result, computer system 670 and/or financial transaction platform 675 can receive location information indicating a number of different locations. However, the location information will indicate that a large number of mobile devices are at very nearly the same location. Once the location information from a sufficient number of mobile devices all indicate substantially the same location, computer system 670 and/or financial transaction platform 675 can establish the location of card reader 655 at that location.

Figure 3:
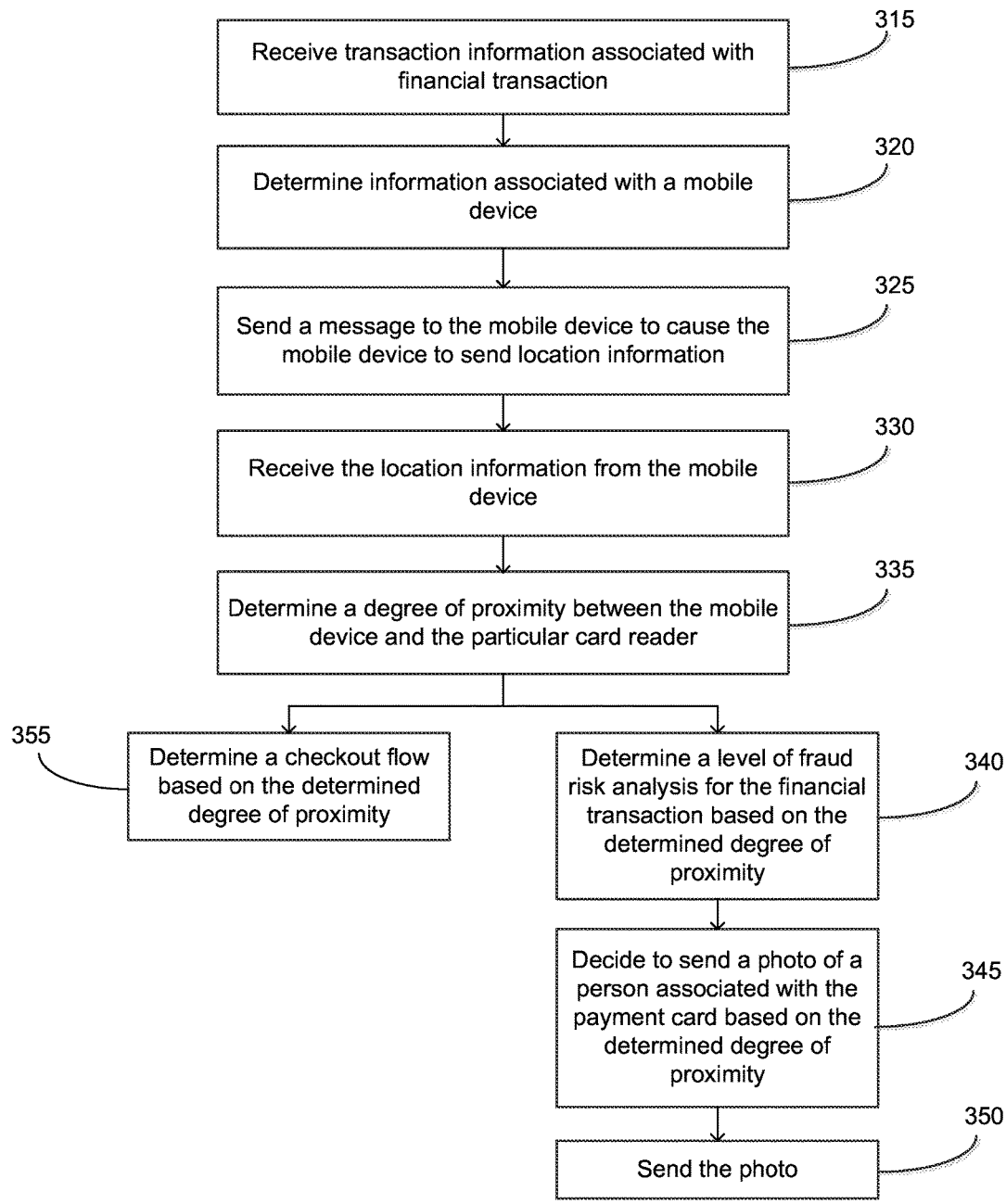
FIG. 3 is a flow diagram of illustrating an example of a process for determining a level of fraud risk analysis based on the proximity between a customer's mobile device and the card reader.

FIG. 3 is a flow diagram of illustrating an example of a process for determining a level of fraud risk analysis based on the proximity between a customer's mobile device and the card reader. Steps 315-330 are respectively the same as steps 215-230 of FIG. 2B, just performed related to a selected transaction involving the particular card reader, after the location of the particular card reader has been established. In steps 215-230, transaction information and the locations of multiple mobile devices during multiple card swipes related to multiple financial transactions are received. In steps 315-330, transaction information and the location of a mobile device during a card swipe related to a selected transaction is received. The transaction can be a financial transaction, or another type of transaction, such as verifying an identity of a person using an identification card, as is discussed in the description of step 110 of FIG. 1. In some embodiments, the location information of step 330 does not specify a geographic location of the mobile device, but rather a location of the mobile device as being at a place of business. For example, the mobile device determines based on wireless communications that the mobile device is located at a merchant. The mobile device can determine that it is at a merchant based on the service set identifier (SSID) of a Wi-Fi network of the merchant, or based on near field communications with a POS system of the merchant, among other ways. Next, at step 335 computer system 670 and/or financial transaction platform 675, or computer system 671 and/or financial transaction platform 676 determine a degree of proximity between the mobile device and the particular card reader. In step 235 of FIG. 2B, as well as step 250 of FIG. 2A, the location of the particular card reader was established. The location of the mobile device is determined based on the location information received during step 330. In various embodiments, computer system 670 and/or financial transaction platform 675, or computer system 671 and/or financial transaction platform 676 determine the degree of proximity. The degree of proximity between the mobile device and the particular card reader is determined by calculating the distance between the mobile device and the established location of the particular card reader, or by determining if the mobile device and the card reader are at the same merchant.

Next, at step 340 computer system 670 and/or financial transaction platform 675, or computer system 671 and/or financial transaction platform 676 determine a level of fraud risk analysis for the financial transaction based on the determined degree of proximity. By validating that the customer's smartphone is located at substantially the same location as the particular card reader, or within a defined proximity of the particular card reader, or at the same merchant as the card reader, when the financial transaction is occurring, the risk that someone has stolen or forged the customer's payment card is greatly reduced. Because this risk is greatly reduced, the level of fraud risk analysis for the financial transaction can be reduced. Conversely, when the customer's smartphone is located at a different location than the particular card reader, or is not located at the same merchant as the particular card reader, the risk that someone has stolen or forged the customer's payment card is increased. In this case, the level of fraud risk analysis is not reduced and can even be increased. In various embodiments, computer system 670 and/or financial transaction platform 675, or computer system 671 and/or financial transaction platform 676 determine the level of level of fraud risk analysis.

Next, at step 345 computer system 670 and/or financial transaction platform 675, or computer system 671 and/or financial transaction platform 676 decide to send a photo of a person associated with the payment card based on the determined degree of proximity. Reducing the level of fraud risk analysis can have various effects. For example, the customer may be required to provide identification or provide a signature at one fraud risk analysis level, and may not be required to provide identification or provide a signature at a reduced level of fraud risk analysis. As part of a reduced level of fraud analysis, a photo can be sent to the POS system being used for the transaction for the merchant to use in place of asking the customer to provide government issued identification. The photo can be associated with the payment card used for the financial transaction via a database.

A photo can also be sent to the POS system as part of a higher level of fraud risk analysis. For example, no identification or any signature may be required for a transaction for a relatively small amount. When the fraud risk level is heightened based on the determined degree of proximity, a photo can be sent to the POS system as part of a higher level of fraud risk analysis. In various embodiments, computer system 670 and/or financial transaction platform 675, or computer system 671 and/or financial transaction platform 676 decide to send the photo. Next, at step 350 computer system 670 and/or financial transaction platform 675, or computer system 671 and/or financial transaction platform 676 send the photo. In various embodiments, computer system 670 and/or financial transaction platform 675, or computer system 671 and/or financial transaction platform 676 send the photo to the POS system used for the financial transaction.

Next, at step 355 computer system 670 and/or financial transaction platform 675, or computer system 671 and/or financial transaction platform 676 determine a checkout flow based on the determined degree of proximity. The checkout flow in this example is the flow associated with the financial transaction that is executed by the POS system used for the financial transaction. Just as the level of fraud risk analysis can change based on the determined degree of proximity, the checkout flow can similarly change based on the determined degree of proximity. For example, when the determined degree of proximity indicates a lower risk of a fraudulent transaction, a streamlined checkout flow is used. In various embodiments, computer system 670 and/or financial transaction platform 675, or computer system 671 and/or financial transaction platform 676 determine, based on the degree of proximity, to use a streamlined checkout flow, and communicate to the POS system used for the financial transaction an indication to use the streamlined checkout flow. The flow can be streamlined, for example, by reducing the number of steps in the checkout process, such as by eliminating a step where the customer's signature is obtained, or by eliminating a step where the customer's identification is checked.

Figure 4:
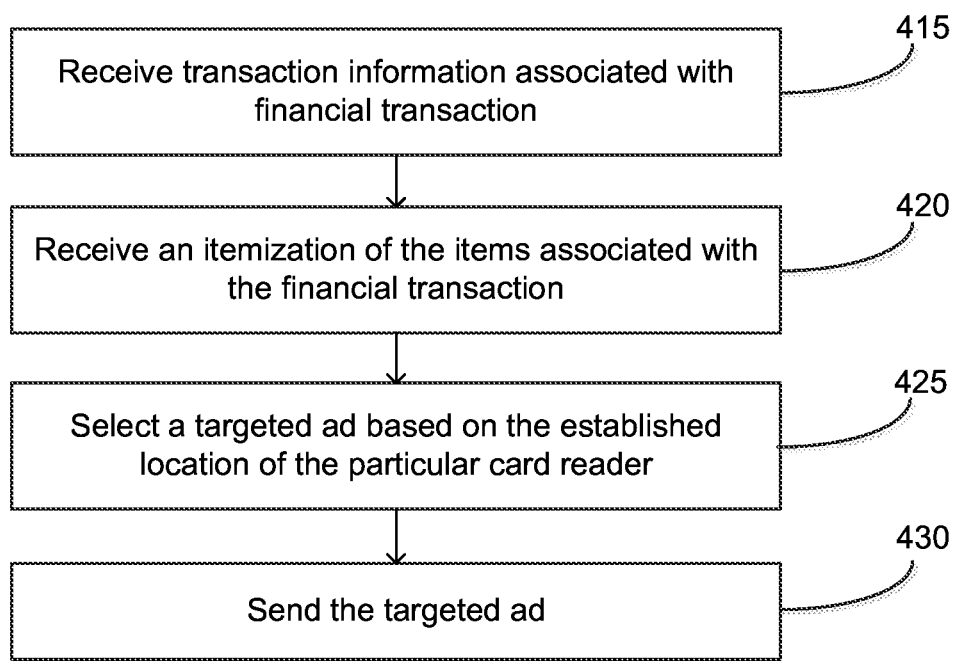
FIG. 4 is a flow diagram illustrating an example of a process for selecting a targeted ad based on the location of a card swipe.

FIG. 4 is a flow diagram illustrating an example of a process for selecting a targeted ad based on the location of a card swipe. This example process will be explained using the example environment of FIG. 6, and will refer to labels of that figure. Step 415 is the same as step 215 of FIG. 2B, just performed related to a selected financial transaction. In step 215, transaction information associated with multiple financial transactions is received. Next, at step 415, at a high level, computer system 670 and/or financial transaction platform 675 receive transaction information associated with a financial transaction. For example: customer 681 initiates a financial transaction with merchant 611 related to the purchase of merchandise; payment card 606 is swiped through card reader 656 to pay for the financial transaction associated with the sale of the merchandise; and, computer system 670 and/or financial transaction platform 675 receive transaction information from POS system 651 related to the financial transaction.

Next, at step 420 computer system 670 and/or financial transaction platform 675 receive an itemization of the items associated with the financial transaction. The itemization of the items can include a list of the merchandise that was scanned or otherwise rung up by POS system 651 related to the financial transaction. Where the financial transaction is related to services, the itemization of the items can include a list of services to be provided. Where the financial transaction is related to rentals, the itemization of the items can include a list of the items to be rented.

Next, at step 425 computer system 670 and/or financial transaction platform 675 select a targeted ad based on the established location of the particular card reader. By following steps 215-235 of FIG. 2B, or steps 250-255 of FIG. 2A, the location of card reader 656 can have been previously established. Computer system 670 and/or financial transaction platform 675 select a targeted ad based on the location of the particular card reader as established during step 235 of FIG. 2B or step 255 of FIG. 2A. Note that the location is selected, not based on the location as determined based on location information from smartphone 691, but rather based on the established location of the particular card reader. Smartphone 691 can have location based services disabled or turned off, or the GPS module of smartphone 691 can even be non-functional with smartphone 691 not being able to determine its location, and a targeted ad can still be selected. This is because the selection of the targeted ad is based on the established location of POS system 651, which can be determined without any location information from smartphone 691. Computer system 670 and/or financial transaction platform 675 select an ad for a store near to the established location of card reader 656.

Further, computer system 670 and/or financial transaction platform 675 can select a targeted ad based on the established location of the particular card reader and on the itemization of the items. The itemization of the items includes a list of merchandise that is being purchased by customer 681. Computer system 670 and/or financial transaction platform 675 analyze the list of merchandise, and determine that customer 681 is shopping for shoes based on the list containing shoes. Computer system 670 and/or financial transaction platform 675 select an ad for a shoe store near to the established location of card reader 656. Next, at step 430 computer system 670 and/or financial transaction platform 675 send the targeted ad. Computer system 670 and/or financial transaction platform 675 send the targeted ad to smartphone 691, and the ad is displayed on smartphone 691.

Figure 5:
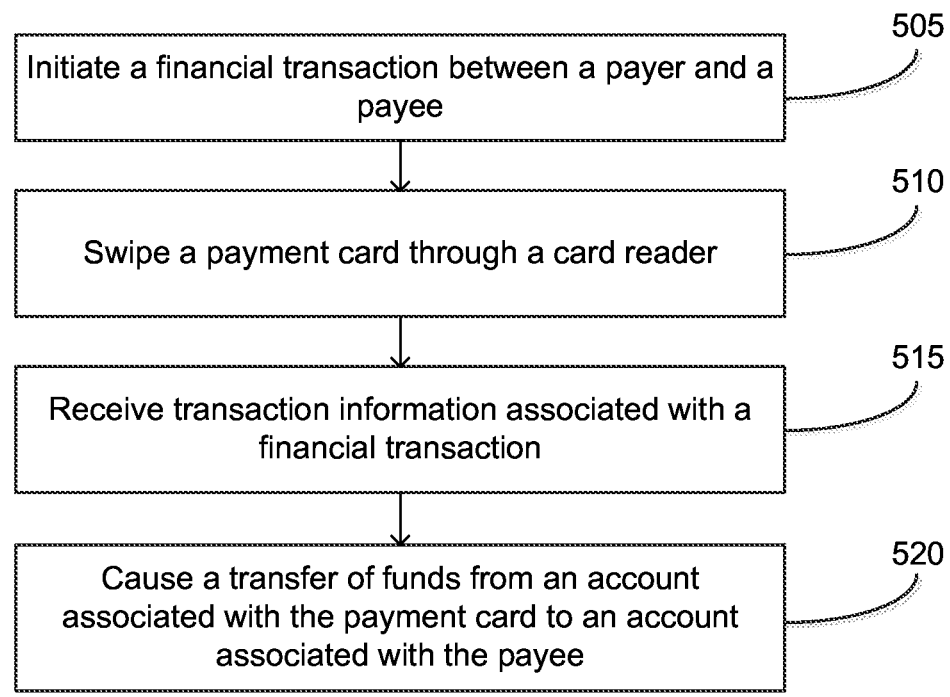
FIG. 5 is a flow diagram illustrating an example of a process for enabling a merchant to engage in a financial transaction with a customer.

FIG. 5 is a flow diagram illustrating an example of a process for enabling a merchant to engage in a financial transaction with a customer. This example process will be explained using the example environment of FIG. 6, and will refer to labels of that figure. While the financial transaction of this example is related to the sale of merchandise, the technique is generally applicable to any type of financial transaction that involves an electronic payment, such as a financial transaction related to services or rentals, among others. While this example is a process for enabling a merchant to engage in a financial transaction with a customer, the same process repeated for multiple customers and multiple merchants can enable the multiple merchants to engage in multiple financial transactions with the multiple customers.

At step 515, computer system 670 and/or financial transaction platform 675 receive transaction information associated with a financial transaction. A financial transaction is initiated between a payer and a payee. Referring to FIG. 6, customer 681, a payer, initiates a financial transaction with merchant 611, a payee. Customer 681 initiates the financial transaction by bringing merchandise he obtained while shopping at the place of business of merchant 611 to POS system 651, and merchant 611 rings up the merchandise using POS system 651. Customer 681 then presents payment card 606 to pay for the financial transaction associated with merchandise purchase. Customer 681 or merchant 711 swipe payment card 606 through card reader 656. Card reader 656 obtains payment card information from payment card 606 and sends the payment card information to POS system 651, to which card reader 656 is coupled. POS system 651 sends the payment card information, along with the transaction information, to computer system 670 and/or financial transaction platform 675, where the information is received.

Next, at step 520 computer system 670 and/or financial transaction platform 675 cause a transfer of funds from an account associated with the payment card to an account associated with the payee. The account associated with the payment card and/or the account associated with the payee can be at financial transaction platform 675, a bank, a credit union, etc. In some embodiments, computer system 670 and/or financial transaction platform 675 work in conjunction with financial system 660 to cause the transfer of funds.

FIG. 6 is an environment in which the techniques introduced here can be implemented. FIG. 6 includes payment card 605 and 606, card reader 655 and 656, POS system 650 and 651, payment card 605 and 606, customer 680 and 681, smartphone 690 and 691, merchant 610 and 611, financial system 660, computer system 670 and 671, and financial transaction platform 675 and 676. The components of this figure are discussed in the descriptions related to FIGS. 1-5.

The environment of FIG. 6 is discussed relative to three communication scenarios. The first scenario has POS system 651 communicating with computer system 670 and/or financial transaction platform 675 to process a payment transaction. The second scenario has POS system 650 communicating with computer system 671 and/or financial transaction platform 676 via financial system 660 to process a payment transaction. The third scenario has POS system 650 communicating with computer system 670 and/or financial transaction platform 675 via financial system 660 to process a payment transaction. These three scenarios are discussed in above the description of FIG. 2B. A person of ordinary skill will recognize that many other scenarios are possible.

FIG. 7 is an illustration of mobile device locations at a time of a corresponding card swipe. FIG. 7 is discussed in the description of FIG. 2B. In one example, a computer system has a database that associates a payment card of a customer with the customer's smartphone. When the customer's payment card is swiped through card reader 656 of POS system 651, POS system 651 communicates with the computer system as part of processing the payment initiated by the card swipe. The computer system obtains contact information for the customer's smartphone from the database, and sends a message to the smartphone requesting location information, which the smartphone sends to the computer system. The location of the smartphone is indicated by one of the small circles of FIG. 7, such as one of the small circles indicated by labels 725 or 710.

This process is repeated for a number of customers, and a number of mobile device locations are received by the computer system, as is represented by the small circles of FIG. 7. Some of the mobile device locations are not near the locations of other mobile devices, as is indicated by label 710. This may be caused, for example, by the customer leaving his smartphone in his car. After a number of the customers' mobile devices report a similar location during a card swipe at card reader 656, as is indicated by label 705, the location of card reader 656 can be established. Mobile device locations that are not near the grouping of mobile device location, such as label 710, can be ignored. The locations of the mobile devices that are nearby each other, as is indicated by label 705, can be used to approximate the location of card reader 656, as is indicated by label 720.

Figure 8:
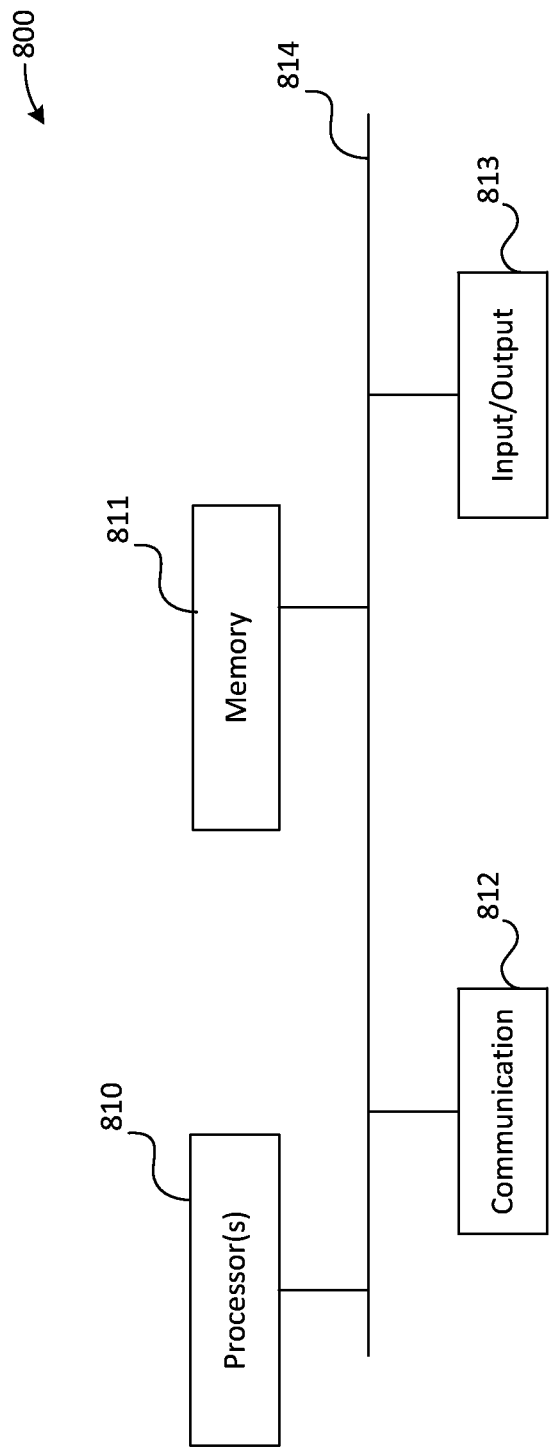
FIG. 8 is a high-level block diagram showing an example of a processing system in which at least some operations related to basing actions on a location of a card swipe can be implemented.

FIG. 8 is a high-level block diagram showing an example of a processing device 800 that can represent any of the devices described above, such as POS system 650 or 651, smartphone 690 or 691, or computer system 670 or 671. Any of these systems also may include two or more processing devices such as represented in FIG. 8, which may be coupled to each other via a network or multiple networks.

In the illustrated embodiment, the processing system 800 includes one or more processors 810, memory 811, a communication device 812, and one or more input/output (I/O) devices 813, all coupled to each other through an interconnect 814. The interconnect 814 may be or include one or more conductive traces, buses, point-to-point connections, controllers, adapters and/or other conventional connection devices. The processor(s) 810 may be or include, for example, one or more general-purpose programmable microprocessors, microcontrollers, application specific integrated circuits (ASICs), programmable gate arrays, or the like, or a combination of such devices. The processor(s) 810 control the overall operation of the processing device 800. Memory 811 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 811 may store data and instructions that configure the processor(s) 810 to execute operations in accordance with the techniques described above. The communication device 812 may be or include, for example, an Ethernet adapter, cable modem, Wi-Fi adapter, cellular transceiver, Bluetooth transceiver, or the like, or a combination thereof. Depending on the specific nature and purpose of the processing device 800, the I/O devices 813 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodi-

What is claimed is:

1. A method comprising:
receiving, by a computer system, from a point-of-sale (POS) system of a merchant, transaction information associated with a plurality of financial transactions between a plurality of customers and the merchant, the received transaction information including payment card information for a plurality of payment cards read with a card reader associated with the POS system and merchant identifying information for the merchant, the plurality of payment cards being associated with a plurality of mobile devices, respectively, of the plurality of customers, respectively, in a data structure maintained by the computer system;
obtaining, by the computer system, from the data structure, based on the transaction information, mobile device information for the plurality of mobile devices associated respectively with the plurality of customers based on the association between the payment card information and the respective mobile devices in the data structure;
sending, by the computer system, based on the mobile device information, a communication to the respective mobile devices to request location information, wherein an application executing on the respective mobile device causes each mobile device, to send, to the computer system, a global positioning system (GPS) coordinate that indicates a location of the respective mobile device at a time corresponding to a read event at which one of the payment cards is read by the card reader;
receiving, by the computer system, a plurality of the GPS coordinates, each of the GPS coordinates being received from a different one of the mobile devices;
determining, by the computer system, based on the received GPS coordinates, a subset of the GPS coordinates that indicate a similar location;
determining, by the computer system, an approximate central location of the subset of the GPS coordinates;
determining, by the computer system, an approximate location of the card reader based on the approximate central location;
receiving, by the computer system, from the POS system, first transaction information including the merchant information and first payment card information obtained via the card reader for a financial transaction between a first customer and the merchant;
based on receiving the first transaction information, determining the approximate location of the card reader determined from the plurality of GPS coordinates received from the plurality of mobile devices and determining, from the data structure, a first mobile device associated with the first payment card;
sending, by the computer system, a communication to the first mobile device to cause the application executing on the first mobile device to send, to the computer system, a first GPS coordinate that indicates a location of the first mobile device at a time corresponding to a read event at which the first payment card is read by the card reader;
based on the first GPS coordinate, determining, by the computer system, a location of the first mobile device;
determining proximity between the first mobile device and the card reader based on a relationship between the location of the first mobile device and the approximate location of the card reader determined from the plurality of GPS coordinates received from the plurality of mobile devices; and
sending, by the computer system, a communication to the POS system to cause the POS system to execute a selected checkout flow based on the proximity.

2. The method of claim 1, wherein the selected checkout flow includes using a reduced level of fraud screening based on the proximity being indicative of the first mobile device being located at substantially the same location as the card reader, in relation to a level of fraud screening used when the proximity is indicative of the first mobile device being located at a different location than the card reader.

3. The method of claim 1, wherein the transaction information includes an itemization of items associated with the financial transaction, the method further comprising:
selecting a targeted ad based on the itemization of the items and the determined location of the first mobile device; and
sending the targeted ad for delivery to the first mobile device associated with the first customer.

4. A method comprising:
receiving, by a computer system, from a point-of-sale (POS) system, transaction information associated with a plurality of electronic transactions between a plurality of users and a merchant,
the electronic transactions involving read events involving a plurality of transaction cards at a card reader associated with the POS system and the merchant,
the plurality of transaction cards being associated with a plurality of mobile devices, respectively, of the plurality of users, respectively, in a data structure maintained by the computer system;
based on receiving the transaction information, determining, from the data structure, the plurality of mobile devices associated with the transaction cards, and sending, by the computer system, respective communications to the plurality of mobile devices;
receiving, by the computer system, from the mobile devices, location information indicative of a plurality of locations, each of the plurality of locations being indicative of a location of a corresponding mobile device at a time corresponding to a read event at which one of the transaction cards is read by the card reader;
determining, by the computer system, based on the location information, a subset of the mobile devices that indicates a similar location;
determining, by the computer system, an approximate location of the card reader based on the similar location of the subset of the mobile devices;
receiving, by the computer system, first mobile device location information indicative of a first location of a first mobile device associated with a card user at a time corresponding to a read event at which a first transaction card associated with the card user is read by the card reader;
determining, by the computer system, a proximity between the first mobile device and the card reader based on the first mobile device location information and the approximate location determined for the card reader; and sending, by the computer system, a communication to the POS system to cause the POS system to execute a selected checkout flow based on the proximity.

5. The method of claim 4, wherein the read event is associated with a financial transaction involving the card user, and wherein the selected checkout flow includes using a level of fraud screening that is lower when the proximity is indicative of the first mobile device being located within a defined proximity of the card reader, in relation to a level of fraud screening used when the proximity is indicative of the first mobile device not being located within the defined proximity of the card reader.

6. The method of claim 4 further comprising:
sending a photo of the card user to the POS system, the photo having previously been associated with the first transaction card, wherein the determined level of fraud screening includes the sending the photo.

7. The method of claim 4, wherein the first transaction card is associated with a plurality of payment accounts, wherein the read event is associated with a financial transaction involving the card user, the method further comprising:
accessing a database that includes stored association information representing an association between the first transaction card and a plurality of payment accounts to determine a payment account from which funds for a payment associated with the financial transaction are to be obtained.

8. The method of claim 4, further comprising:
selecting a targeted ad based on the proximity.

9. The method of claim 4, wherein the read event is associated with a financial transaction involving the card user, further comprising:
receiving an itemization of items associated with the financial transaction from the POS system; and
selecting a targeted ad based on the itemization of the items and the determined location of the card reader.

10. A system comprising:
a communication device through which to communicate with remote devices;
a processor coupled to the communication device; and
a memory coupled to the processor, the memory storing instructions which when executed by the processor cause the system to perform operations including:
receiving, via the communication device, from a point-of-sale (POS) system, transaction information associated with a plurality of electronic transactions between a plurality of users and a payee,
the electronic transactions involving read events involving a plurality of transaction cards at a card reader associated with the POS system and the payee,
the plurality of transaction cards being associated with a plurality of mobile devices, respectively, of the plurality of users, respectively, in a data structure maintained by the system;
based on receiving the transaction information, determining, from the data structure, the plurality of mobile devices associated with the plurality of transaction cards, and sending communications to the plurality of mobile devices to cause an application executing on each of the mobile devices to send location information at a time corresponding to a respective read event;
receiving the location information from the mobile devices;
determining, from the received location information of a subset of the mobile devices that indicate a similar location;
determining an approximate location of the card reader based on the indicated similar location information from the subset of the mobile devices;
receiving mobile device location information that indicates a location of a first mobile device associated with a card user at a time corresponding to a read event involving a first transaction card associated in the data structure with the first mobile device and the card user, the first transaction card being used at the card reader to initiate the read event;
determining a proximity between the first mobile device and the card reader based on the mobile device location information and the approximate location of the card reader; and
sending a communication to the POS system to cause the POS system to execute a selected checkout flow based on the proximity.

11. The system of claim 10, wherein the read event is associated with a financial transaction involving the card user, and wherein the selected checkout flow includes using a level of fraud screening that is lower when the proximity is indicative of the first mobile device being located within a defined proximity of the approximate location of the card reader, in relation to a level of fraud screening used when the proximity is indicative of the mobile device being located outside a defined proximity of the approximate location of the card reader.

12. The system of claim 10, wherein the read event is associated with a financial transaction involving the card user and the payee, and wherein the selected checkout flow includes using a level of fraud screening is higher when the proximity is indicative of the mobile device being located at a place other than a place of business of the payee, in relation to a level of fraud screening used when the proximity is indicative of the mobile device being located at the place of business of the payee.

13. The system of claim 10, wherein the read event is associated with a financial transaction involving the card user, wherein the operations further include:
receiving transaction information associated with the POS system;
determining the checkout flow to use in association with the financial transaction based on the proximity between the mobile device and the card reader; and
sending the communication to the POS system, in response to which the POS system uses the checkout flow.

14. The system of claim 10, wherein the read event is associated with a financial transaction involving the card user, wherein the operations further include:
receiving transaction information associated with the financial transaction from the POS system;
determining to use a reduced checkout flow in association with the financial transaction based on the proximity indicating that the mobile device and the card reader are located at substantially the same location, the reduced checkout flow having fewer steps in relation to a second checkout flow used when the proximity does not indicate that the mobile device and the card reader are located at substantially the same location; and
sending the communication to the POS system, in response to which the POS system uses the reduced checkout flow.

15. The method of claim 4, wherein the location information indicative of the plurality of locations includes GPS coordinates, and wherein each of the GPS coordinates was received from a different one of the mobile devices.

16. The method of claim 4, wherein the determining the approximate location of the card reader based on the location information of the subset of the mobile devices includes determining an approximate central location of the subset of the mobile devices based on the location information of the subset of the mobile devices.

17. The method of claim 16, wherein the determining the approximate central location includes calculating a center of mass based on the location information of the subset of the mobile devices.

18. The method of claim 17, wherein the calculating the center of mass includes minimizing a sum of squares of distances to locations of each of the subset of the mobile devices.

* * * * *